US012406337B2

United States Patent
Weinmann et al.

(10) Patent No.: US 12,406,337 B2
(45) Date of Patent: *Sep. 2, 2025

(54) DETECTION OF LOSS OF DETAILS IN A DENOISED IMAGE

(71) Applicant: DASSAULT SYSTEMES, Vélizy-Villacoublay (FR)

(72) Inventors: Andreas Weinmann, Munich (DE); Holger Dammertz, Munich (DE)

(73) Assignee: DASSAULT SYSTEMES, Vélizy-Villacoublay (FR)

(*) Notice: Subject to any disclaimer, the term of this patent is extended or adjusted under 35 U.S.C. 154(b) by 489 days.

This patent is subject to a terminal disclaimer.

(21) Appl. No.: 17/557,330

(22) Filed: Dec. 21, 2021

(65) Prior Publication Data

US 2022/0215510 A1 Jul. 7, 2022

(30) Foreign Application Priority Data

Dec. 21, 2020 (EP) ..................................... 20306653

(51) Int. Cl.
*G06T 5/70* (2024.01)
*G06T 3/4084* (2024.01)
*G06T 5/50* (2006.01)

(52) U.S. Cl.
CPC .............. *G06T 5/70* (2024.01); *G06T 3/4084* (2013.01); *G06T 5/50* (2013.01); *G06T 2207/20084* (2013.01); *G06T 2207/20182* (2013.01)

(58) Field of Classification Search
CPC  G06T 5/70; G06T 5/50; G06T 3/4084; G06T 2207/20084; G06T 2207/20182
See application file for complete search history.

(56) References Cited

U.S. PATENT DOCUMENTS

2018/0075581 A1* 3/2018 Shi .......................... G06N 3/045
2018/0293711 A1* 10/2018 Vogels ..................... G06F 17/10
(Continued)

FOREIGN PATENT DOCUMENTS

CN          110070510 A       7/2019
WO     WO 2017/223560 A1    12/2017

OTHER PUBLICATIONS

Extended European Search Report issued Jun. 18, 2021, in Patent Application No. 20306653.5.
(Continued)

*Primary Examiner* — Shefali D Goradia
(74) *Attorney, Agent, or Firm* — Oblon, McClelland, Maier & Neustadt, L.L.P.

(57) ABSTRACT

A computer-implemented method for forming a dataset configured for learning a Convolutional Neural Network (CNN) architecture including an image feature extractor. It comprises providing pairs of images, each pair comprising a reference image and a respective denoised image. For each pair of images, the method provides the pair of images to a pre-trained CNN architecture similar to the one the formed dataset will be configured for. The method computes an error map representing a difference between a first normalized feature of the denoised image and a second normalized feature of the reference image, the first and second normalized features being the output of a same layer of the pre-trained CNN architecture and adds the respective denoised image and the error map to the dataset. This constitutes an improved solution with respect to forming a dataset for learning a CNN architecture to identify areas of degradation generated by a denoiser.

16 Claims, 21 Drawing Sheets

(56) References Cited

U.S. PATENT DOCUMENTS

| | | | |
|---|---|---|---|
| 2018/0293713 A1 | 10/2018 | Vogels et al. | |
| 2020/0099920 A1* | 3/2020 | Khamis | G06T 7/90 |
| 2022/0198612 A1* | 6/2022 | Weinmann | G06T 3/40 |

OTHER PUBLICATIONS

Extended European Search Report issued Jun. 18, 2021, in Patent Application No. 20306654.3.

Thijs Vogels, et al., "Denoising with Kernel Prediction and Asymmetric Loss Functions", ACM Transactions on Graphics, vol. 37, No. 4, Article 124, Aug. 10, 2018, XP055711661, pp. 1-15.

Justin Johnson, et al., "Perceptual Losses for Real-Time Style Transfer and Super-Resolution", ICIAP: Proceedings of the 17th International Conference on Image Analysis and Processing, vol. 9906, No. 558, Chapter 43, Sep. 17, 2016, XP047356366, pp. 694-711.

Taimoor Tariq, et al., "A Psychovisual Analysis on Deep CNN Features for Perceptual Metrics and a Novel Psychovisual Loss", arxiv.org, ARXIV:1812.00412v1 [cs.CV], Cornell University Library, Dec. 2, 2018, XP080988024.

Steve Bako, et al., "Kernel-Predicting Convolutional Networks for Denoising Monte Carlo Renderings", ACM Transactions on Graphics, vol. 36, No. 4, Article 97, Jul. 2017, pp. 1-14.

Chakravarty R. Alla Chaitanya, "Interactive Reconstruction of Monte Carlo Image Sequences using a Recurrent Denoising Autoencoder", Acm Transactions On Graphics, vol. 36, No. 4, Article 98, Jul. 2017, pp. 1-12.

Leon A. Gatys, et al., "A Neural Algorithm of Artistic Style", arxiv.org, ARXIV:1508.06576v2 [cs.CV], Sep. 2, 2015, pp. 1-16.

J. Hasselgren, et al., Neural Temporal Adaptive Sampling and Denoising, Computer Graphics Forum, vol. 39, Issue 2, Jul. 13, 2020, pp. 147-155 (Abstract only).

"Intel® Open Image Denoise", Intel Corporation, https://www.openimagedenoise.org/, 2018-2021, 5 pages.

James T. Kajiya, "The Rendering Equation", ACM SIGGRAPH Computer Graphics, vol. 20, No. 4, Aug. 18-22, 1986, pp. 143-150.

Alexandr Kuznetsov, et al., "Deep Adaptive Sampling for Low Sample Count Rendering", Eurographics Symposium on Rendering, vol. 37, No. 4, 2018, pp. 1-10.

Zewen Li, "A Survey of Convolutional Neural Networks: Analysis, Applications, and Prospects", IEEE Transactions on Neural Networks and Learning Systems, Apr. 2020, pp. 1-21.

Yann Lecun, et al., "Gradient-Based Learning Applied to Document Recognition", Proceedings of the IEEE, vol. 86, Issue 11, Nov. 1998, pp. 2278-2324.

Guilin Liu, et al., "Image Inpainting for Irregular Holes Using Partial Convolutions", ECCV, 2018, pp. 1-16.

Michael D. McCool, "Anisotropic Diffusion for Monte Carlo Noise Reduction", ACM Transactions on Graphics, vol. 18, No. 2, Apr. 1999, pp. 171-194.

"Nvidia OptiX™ AI-Accelerated Denoiser", https://developer.nvidia.com/optix-denoiser, 2021, 11 pages.

Matt Pharr, et al., "Physically Based Rendering: From Theory To Implementation", http://www.pbr-book.org/3ed-2018/contents.html, 3rd Edition, 2016, pp. 1-1235 (Abstract only).

Holly E. Rushmeier, et al., "Energy Preserving Non-Linear Filters", Computer Graphics Proceedings, Annual Conference Series, Jul. 24-29, 1994, pp. 131-138.

Karen Simonyan, et al., Very Deep Convolutional Networks for Large-Scale Image Recognition, ICLR, Apr. 10, 2015, pp. 1-14.

Pascal Vincent, et al., "Extracting and Composing Robust Features with Denoising Autoencoders", Proceedings of the 25th International Conference on Machine Learning, 2008, 8 pages.

Richard Zhang, et al., "The Unreasonable Effectiveness of Deep Features as a Perceptual Metric", ARXIV:1801.03924v2 [cs.CV], Apr. 10, 2018, pp. 1-14.

Matthias Zwicker, et al., "Recent Advances in Adaptive Sampling and Reconstruction for Monte Carlo Rendering", Eurographics, 2015, 17 pages.

Office Action dated Apr. 17, 2025, issued in counterpart CN Application No. 202111569959.3, with English Translation. (20 pages).

* cited by examiner

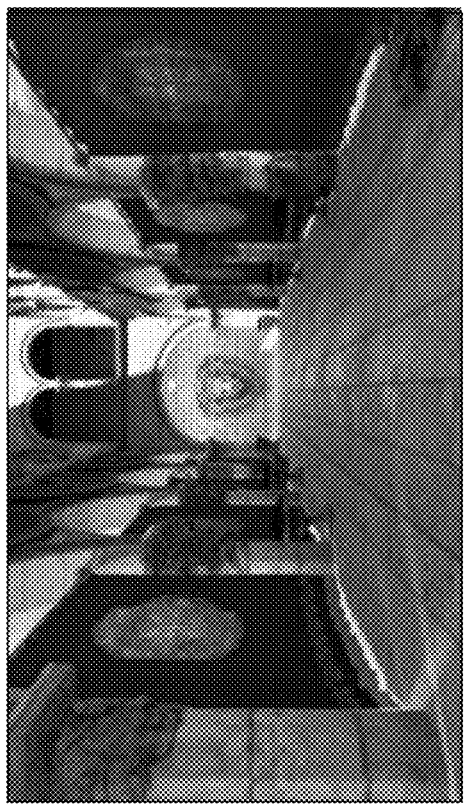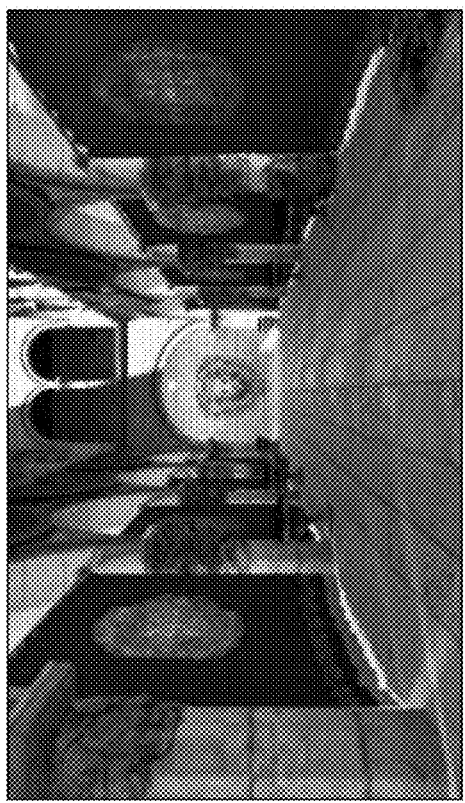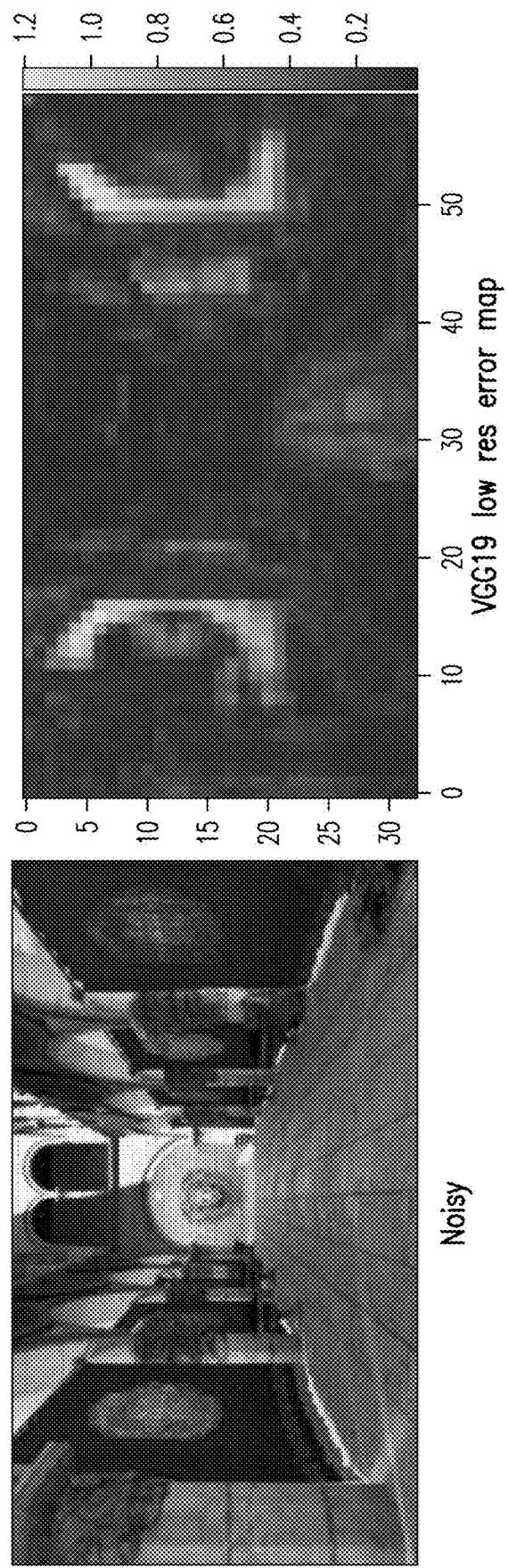
FIG.11

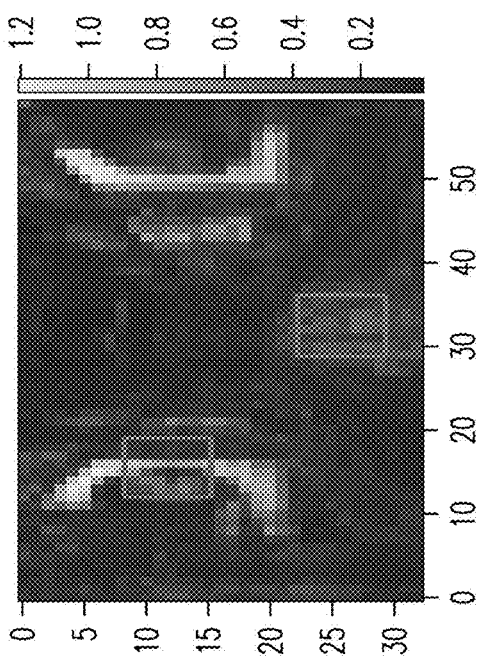
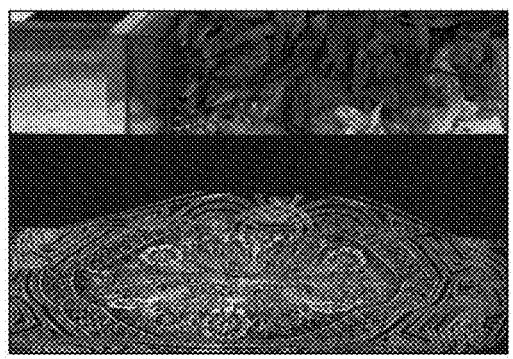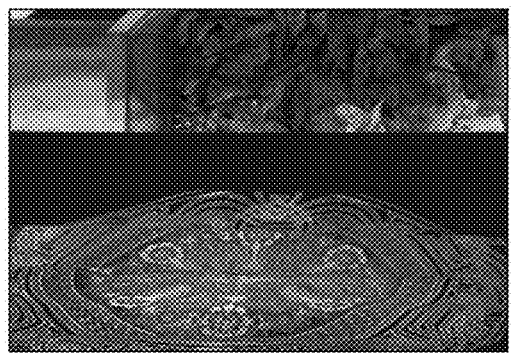
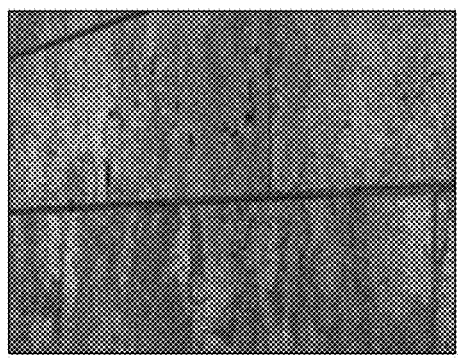
FIG. 12

DETECTION OF LOSS OF DETAILS IN A DENOISED IMAGE

CROSS-REFERENCE TO RELATED APPLICATIONS

This application claims priority under 35 U.S.C. § 119 or 365 to European Application No. 20306653.5, filed Dec. 21, 2020. The entire contents of the above application(s) are incorporated herein by reference.

FIELD

The disclosure relates to the field of computer programs and systems, and more specifically to a method, system and program for detecting loss of details in a denoised image.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Within this context, the field of computer graphics offers technologies which are more and more useful. Within this field, ray-traced images are used to produce images of high degree of visual realism, and techniques for rendering ray-traced images are gaining wide importance.

Monte-Carlo rendering is a known technique used to render high quality ray-traced images. It is based on numerical integration using random samples to compute the higher order integral of an underlying rendering equation which describes light reflection. Due to the random sampling, Monte-Carlo rendering is of stochastic nature, thus the resulting image is noisy. Increasing the number of samples makes the Monte-Carlo rendering more accurate, and iteratively converges to the correct results as the number of samples increases. Pharr, M., Jakob, W., & Humphreys, G. (2018), *Physically Based Rendering: From Theory To Implementation*, provides a detailed survey of the main mathematical concepts underlying Monte-Carlo rendering. Monte-Carlo rendering is a process that takes a lot of computational time and resources to compute, thus minimizing the number of samples that must be taken while reducing the variance due to noise is a highly important task.

Some algorithms use sampling strategies to sample as close as possible to the underlying distribution to reduce the variance. There are various sampling strategies that can be performed for achieving this, such as uniform sampling, stratified sampling or importance sampling. These are known as fixed scheme sampling strategies. Adaptive sampling is a sampling strategy that defines sampling densities based on previous samples rather than on a fixed scheme. Essentially, adaptive sampling allows distributing samples in the image space where they are needed to minimize the outputs variance. Most adaptive sampling techniques require a reconstruction process. Zwicker, M., Jarosz, W., Lehtinen, J., Moon, B., Ramamoorthi, R., Rousselle, F., Sen, P., Soler, C., Yoon, S.-E. (2015), *Recent Advances in Adaptive Sampling and Reconstruction for Monte Carlo Rendering* provides a detailed survey on background art on adaptive sampling.

While sampling algorithms allow to render high quality images using an appropriate sampling strategy, there is the drawback that the number of samples required to achieve an image with low noise may be computationally prohibitive. Denoising Monte-Carlo rendering refers to techniques that aim for reducing the variance of the sampled ray-traced images. It can be described into a priori and a posteriori techniques. Zwicker, M., Jarosz, W., Lehtinen, J., Moon, B., Ramamoorthi, R., Rousselle, F., Sen, P., Soler, C., Yoon, S.-E. (2015), *Recent Advances in Adaptive Sampling and Reconstruction for Monte Carlo Rendering* provides a detailed survey on background art on a posteriori techniques for denoising monte-Carlo Rendering. A posteriori methods operate on the output of the renderer with only little additional information (like normal and albedo buffer) and no knowledge about the internal computations. The key idea is to use a family of reconstruction filters and develop error estimates for the filter outputs. Most current systems are based on the idea of non-linear image-space filters, as described in Rushmeier, H. E., & Ward, G. J. (1994), *Energy preserving non-linear filters*, and the usage of auxiliary features like normal and albedo buffers, as introduced in McCool, M. D. (1999), Anisotropic Diffusion for Monte Carlo Noise Reduction.

Neural networks, and in particular convolutional neural networks, have been deployed in computer vision systems, including denoising systems. Li, Z., Yang, W., Peng, S., & Liu, F. (2020), *A Survey of Convolutional Neural Networks: Analysis, Applications, and Prospects*, Liu, G., Reda, F. A., Shih, K. J., Wang, T.-C., Tao, A., & Catanzaro, B. (2018), *Image Inpainting for Irregular Holes Using Partial Convolutions*,] Vincent, P., Larochelle, H., Bengio, Y., & Manzagol, P.-A. (2008), Extracting and composing robust features with denoising autoencoders provide examples of the use of convolutional neural networks in computer vision systems like image classification as well as generative image systems like image synthesis, inpainting, or denoising. Gatys, L. A., Ecker, A. S., & Bethge, M. (2015), *A Neural Algorithm of Artistic Style*, describes using image classification networks as a loss function to transfer the style from one image to another, by using the weights of a pre-trained VGG19 convolutional neural network. Zhang, R., Isola, P., Efros, A. A., Shechtman, E., & Wang, O. (2018), *The Unreasonable Effectiveness of Deep Features as a Perceptual Metric*, describes using the weights of a pre-trained VGG19 convolutional neural network to assess the perceptual similarity between two images by training a network that operates on the filter maps produced by the pre-trained classification networks to measure its perceptual similarity. Bako, S., Vogels, T., Mcwilliams, B., Meyer, M., Novák, J., Harvill, A., Sen, P., DeRose, T., Rousselle, F. (2017), *Kernel-Predicting Convolutional Networks for Denoising Monte Carlo Renderings*, describes a denoiser where a neural network is used to estimate local weighting kernels that are used to compute each denoised pixel from its neighbors. Chaitanya, C. R., Kaplanyan, A. S., Schied, C., Salvi, M., Lefohn, A., Nowrouzezahrai, D., & Aila, T. (2017), *Interactive Reconstruction of Monte Carlo Image Sequences Using a Recurrent Denoising Autoencoder*, describes a denoise that operates on image sequences and directly predicts the denoised pixel from the input. There exists commercial denoiser solutions such as the Nvidia OptiX Denoiser or the Intel Open Image Denoise, which are partly based on the techniques of Chaitanya, C. R., Kaplanyan, A. S., Schied, C., Salvi, M., Lefohn, A., Nowrouzezahrai, D., & Aila, T. (2017), *Interactive Reconstruction of Monte Carlo Image Sequences Using a Recurrent Denoising Autoencoder.*

While the denoising reduces the variance due to noise, fine details may be lost in the denoising process, e.g., like leather structure background in final frame rendering, resulting in blurred images. Kuznetsov, A., Kalantari, N. K., & Ramamoorthi, R. (2018), *Deep Adaptive Sampling for Low Sample Count Rendering*, describes combining adaptive sampling with denoising by using two neural networks. One of the neural networks operates in front of the renderer, producing an adaptive sampling map from a single sample image, focusing on low sample counts. The other neural network denoiser the adaptively sampled rendering. However, as the neural network used for sampling operates on low sample counts, it does not sample properly thin structures in noisy areas, thus the details are lost after denoising. Hasselgren, J., Munkberg, J., Salvi, M., Patney, A., & Lefohn, A. (2020), *Neural Temporal Adaptive Sampling and Denoising* extends the system of Kuznetsov, A., Kalantari, N. K., & Ramamoorthi, R. (2018) to operate on image sequences by extending the system to the temporal domain, creating a recurrent loop by temporal wrapping of the previous frame and feeding it to the adaptive sample map network, but presenting the same problems of loss of detail after denoising.

FIGS. 6 and 7 show examples of denoising errors detected by prior art methods.

FIG. 6 shows a ray-traced image of a furniture comprising a leather texture. The image is rendered with a high number of Monte-Carlo samples, i.e., the image is quite converged to the reference image. In the case of images rendered with high Monte-Carlo samples, denoising can degrade the quality compared to not denoising the input at all. Indeed, the denoising can blur the leather structure. The upper left image of FIG. 6 shows a denoised image and the upper left part shows its respective reference image. Visual inspection of the denoised image and reference image shows clearly the quality degradation. The degradation can be partly detected with standard metrics, but the high sampling of the image does not allow to systematically discriminate the regions that are degraded due to the denoiser. The lower left part of FIG. 6 shows standard metrics showing the mean absolute error between the denoised image and the reference image. However, from a standard metric perspective, the actual pixel error is quite low. Indeed, the lower left part of FIG. 6 shows an error map showing the mean absolute error between the denoised image and the reference image. Darker areas of the error map correspond to areas with low or no error. Lighter areas correspond to areas with greater error. The error map shown in the lower left part of FIG. 6 does not discriminate the loss of detail of the leather texture. Other metrics include the structural similarity index measure (SSIM). The lower right part of FIG. 6 shows an error map showing the SSIM between the denoised image and the reference image. The SSIM slightly improves showing areas that are degraded by the denoising, assigning a slightly higher error to those areas. However, SSIM is still not adequate enough to be used as a detection metric. Indeed, the SSIM error map shows blurred-like errors, therefore making it difficult to clearly discriminate the areas where small structural details are distorted.

FIG. 7 shows a similar example with a rendering of a plastic bottle, wherein visual inspection confirms that the denoised image on the upper left part presents blurring of the letters engraved in the plastic bottle compared to the reference image. However, both the mean absolute error and the SSIM fail to show the areas where the letters where blurred.

Within this context, there is still a need for improved method for detecting loss of details in denoised images.

SUMMARY

It is therefore provided computer-implemented method for forming a dataset configured for learning a Convolutional Neural Network (CNN) architecture. The CNN architecture comprises an image feature extractor. The method comprises:
  providing pairs of images, each pair comprising a reference image and a respective denoised image;
  for each pair of images:
    providing the pair of images to a pre-trained CNN architecture similar to the one the formed dataset will be configured for;
    computing a difference between a first normalized feature of the denoised image and a second normalized feature of the reference image, the first and second normalized features being the output of a same layer of the pre-trained CNN architecture;
    computing an error map representing the computed difference; and
    adding the respective denoised image and the error map to the dataset.

The method may further comprise one or more of the following:
  Computing the error map comprises:
  down-sampling the resolution of the computed difference; and
  computing the error map with the down-sampled resolution of the difference, each pixel of the error map having a color following a color scale that penalizes the computed difference, thereby obtaining a coarse error map;
  The pre-trained CNN architecture is a Visual Geometric Group (VGG) architecture;
  The Visual Geometric Group (VGG) architecture is a VGG-19 architecture, and wherein the first normalized feature of the denoised image and the second normalized feature of the reference image are extracted from the 7th and/or 9th and/or 12th layers of the VGG-19 architecture;
  The adding comprises:
    adding to the dataset the respective denoised image, the error map, and a respective noisy image of the reference image, the noisy image being the one from which the denoised image has been obtained;

The respective denoised image is the result of inputting to a denoiser a lower sample count image of the reference image denoised by the denoiser;

It is further provided a data structure representing a dataset formable according to the method.

It is further provided a computer-implemented method of use of the dataset represented in the data structure. The method comprises learning a convolutional neural network (CNN) architecture based on the dataset.

The computer-implemented method of use may comprise one or more of the following:

The learning is a supervised learning;

The CNN architecture being learnt is identical and has a same number of layers as the pre-trained CNN architecture, all the layers of the CNN architecture being learnt after the layer of the pre-trained CNN architecture having generated the first and second normalized features being removed;

It is further provided a computer program comprising instructions for performing any of the methods.

It is further provided a computer readable data storage medium having recorded thereon the computer program and/or the data structure.

It is further provided a dataset formable according to the method.

A computer-implemented method of machine learning, for learning a Convolutional Neural Network (CNN) architecture for estimating a degradation generated by a denoiser on a ray traced image is also provided. The method comprises:
 providing a dataset obtained by:
 providing pairs of images, each pair comprising a reference image and a respective denoised image;
 for each pair of images:
  providing the pair of images to a pre-trained CNN architecture similar to the CNN architecture being learnt for estimating a degradation generated by a denoiser on a ray traced image;
  computing a difference between a first normalized feature of the denoised image and a second normalized feature of the reference image, the first and second normalized features being the output of a same layer of the pre-trained CNN architecture;
  computing an error map representing the computed difference; and
  adding the respective denoised image, the error map to the dataset and a respective noisy image of the reference image, the noisy image being the one from which the denoised image has been obtained;
 learning the CNN architecture based on the provided dataset, the learning comprising taking as input an image generated by the denoiser and its corresponding noisy image of the dataset, and outputting an error map.

The method may further comprise one or more of the following:

The learned CNN architecture further takes as input, for each denoised image of the dataset, an albedo map and a normal buffer.

The learning is a supervised learning.

The CNN architecture being learnt is identical and has a same number of layers as the pre-trained CNN architecture, all the layers of the CNN architecture being learnt after the layer of the pre-trained CNN architecture having generated the first and second normalized features being removed.

Computing the error map comprises:
 down-sampling the resolution of the computed difference; and
 computing the error map with the down-sampled resolution of the difference, each pixel of the error map having a color following a color scale that penalizes the computed difference, thereby obtaining a coarse error map.

The pre-trained CNN architecture and the CNN architecture being learnt are Visual Geometric Group (VGG) architecture.

The Visual Geometric Group (VGG) architecture is a VGG-19 architecture, and wherein the first normalized feature of the denoised image and the second normalized feature of the reference image are extracted from the 7th and/or 9th and/or 12th layers of the VGG-19 architecture.

It is further provided a CNN architecture learnable according to the method of machine learning, for learning a Convolutional Neural Network (CNN) architecture for estimating a degradation generated by a denoiser on a ray traced image.

It is further provided a computer-implemented method of use of the CNN architecture. The method comprises:
 providing a first and second Monte-Carlo ray-traced images rendered from a same shot, the first and the second rendered Monte-Carlo ray-traced images being different;
 providing a first denoised image of the first image;
 by applying the first image and the first denoised image to the CNN architecture, obtaining an error map;
 computing a blend map from the obtained error map, the blend map representing signal-to-noise decibel levels for each area of the error map;
 estimating a variance from the first and second images;
 computing, from the estimated variance between the first and second images, a sample map indicating the number of Monte-Carlo samples required to reach a signal-to-noise decibel level;
 rendering a third Monte-Carlo ray-traced image of the shot with a number of Monte-Carlo samples identified from the sample map;
 providing the rendered third Monte-Carlo rendered ray-traced image as input to a denoiser, thereby obtaining a corresponding denoised image; and
 blending the third Monte-Carlo rendered ray-traced image with the obtained corresponding denoised image, the blending being weighted for each area of the blend map that has a signal-to-noise decibel levels higher than a threshold. The method of use may comprise one or more of the following:

Computing the blend map from the obtained error map comprises:
 normalizing the error map by applying a sigmoid function to the error map; and
 computing the blend map by computing decibel values of each area of the error map from a target root mean square error between the normalized error map and a target error map.

The provided first Monte-Carlo ray-traced image has been rendered with a first number of Monte-Carlo samples and the second rendered Monte-Carlo ray-traced image has been rendered with a second number of Monte-Carlo samples, the first number of Monte-Carlo samples being larger or equal than the second numbers of Monte-Carlo samples.

The second number of Monte-Carlo samples is half the first number of Monte-Carlo samples.

The provided first Monte-Carlo ray-traced image has been rendered according to a first random seed and the provided second Monte-Carlo ray-traced image has been rendered according to a second random seed, the first number of Monte-Carlo samples equal to the second numbers of Monte-Carlo samples.

It is further provided a computer program comprising instructions for performing any of the methods.

It is further provided a computer readable data storage medium having recorded thereon the computer program and/or the neural network.

BRIEF DESCRIPTION OF THE DRAWINGS

The disclosure will now be described, by way of non-limiting examples, and in reference to the accompanying drawings, where:

FIGS. 11, 12 and 13 show examples of error maps computed according to the method;

DETAILED DESCRIPTION

Figure 1:
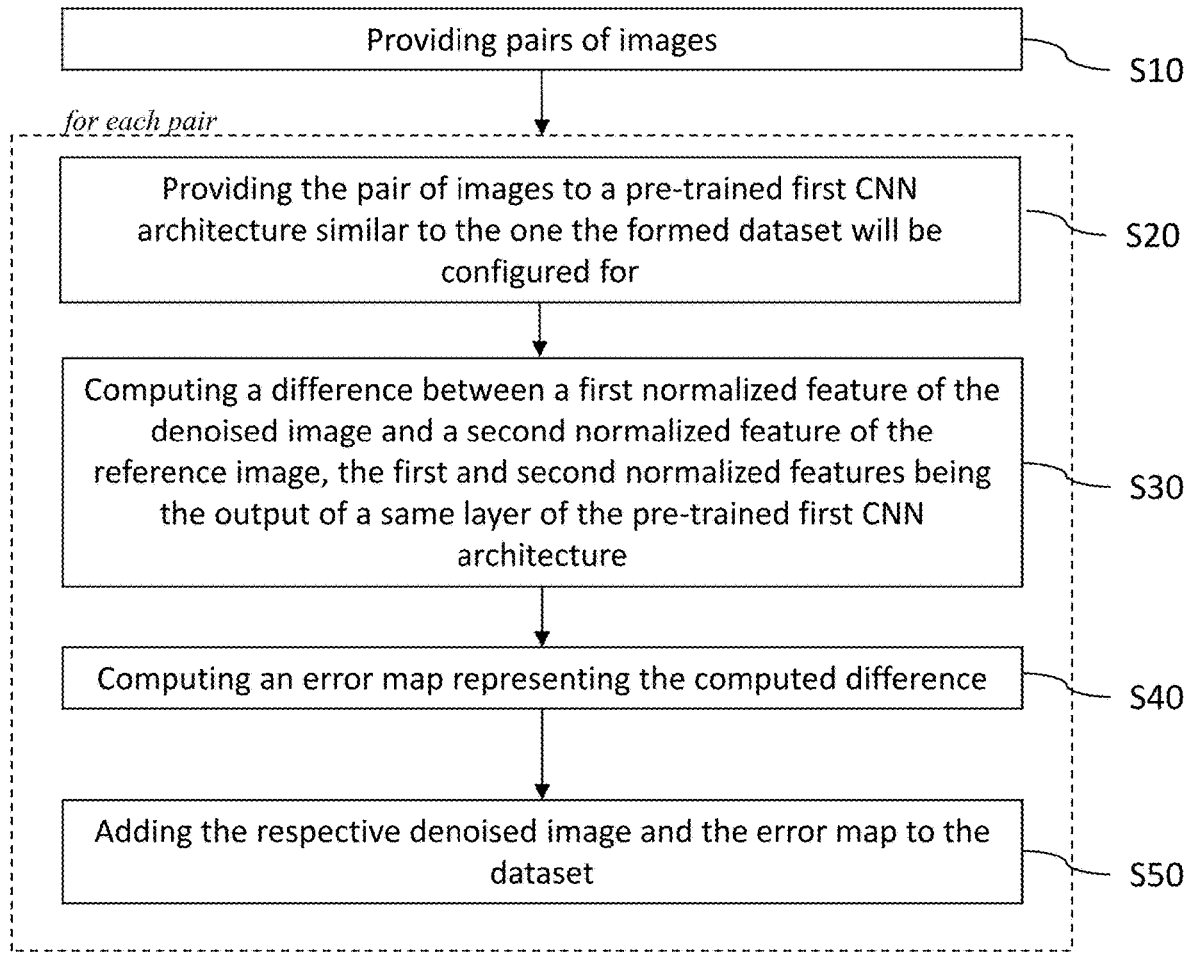
FIGS. 1, 2 and 3 show flowcharts of the method.

Reference is made to FIG. 1, it is hereby provided a method for forming a dataset configured for learning a Convolutional Neural Network (CNN) architecture, the CNN architecture comprising an image feature extractor.

As known from the field of machine-learning, the processing of an input by the neural network includes applying operations to the input, the operations being defined by data including weight values. The learning of the neural network thus includes determining values of the weights based on a dataset configured for such learning. For that, the dataset includes data pieces each forming a respective training sample. The training samples represent the diversity of the situations where the neural network is to be used after being learnt. Any dataset referred herein may comprise a number of training samples higher than 1000, 10000, 100000, or 1000000.

It is thus notably proposed a computer-implemented method for forming such a dataset, which may be referred to as "the dataset-forming method". It is also proposed a computer-implemented method for performing such a learning, which may be referred to as "the learning method" and will be discussed later.

A machine-learning process may comprise the dataset-forming method and/or the learning method.

A machine-learning process may notably comprise both the dataset-forming method and the learning method. The learning method may for example be performed at least partly based on the dataset formed by the dataset-forming method, in examples after the dataset-forming method. Such a machine-learning process is particularly efficient and provides improved accuracy.

Alternatively, a machine-learning process may comprise the dataset-forming method and performing, based on the dataset, any other computer-implemented method (than the proposed learning method) for learning the neural network. Yet alternatively, a machine-learning process may comprise performing the learning method on a dataset provided by any other computer-implemented method (than the proposed dataset-forming method), such as another method for forming a dataset or a retrieval of a dataset as such.

By "dataset", it is meant any data structure comprising training samples and configured for machine-learning, the data structure being recorded on memory of the computer system and accessible to the processor. The dataset-forming method may comprise recording the dataset on non-volatile memory.

Referring back to FIG. 1, at step S10, pairs of images are provided. Each pair comprises a reference image and a respective denoised image. The reference image corresponds to an image substantially close to the image that would correspond to the exact solution of the rendering equation governing the image, thus having high detail and low noise. A "denoiser" is any algorithm, representing a series of computations, wherein at least a part of said algorithm that takes as input a ray-traced image, the ray-traced image being rendered with any number of samples or sample strategy. The denoiser applies, to the input ray-traced image, a series of computations of signal processing to the ray-traced image. For example, the denoiser may apply filters to the ray-traced image. In the field of signal processing, especially in applications to denoising ray-traced image, the set of computations follow techniques of a posteriori methods. The specific computations performed by the denoiser to the ray-traced image are not the subject of the disclosure, and thus details of its application are omitted. A standard reference for a posteriori methods, and other methods for denoising is Zwicker, M., Jarosz, W., Lehtinen, J., Moon, B., Ramamoorthi, R., Rousselle, F., Sen, P., Soler, C., Yoon, S.-E, (2015), *Recent Advances in Adaptive Sampling and Reconstruction for Monte Carlo Rendering*. The respective denoised image corresponds to the output of the denoiser, corresponding to the result of the application of the computations by the denoiser to the input image that was an image that was sampled from the same rendering equation as the reference image.

For each pair of images comprising the reference image and the respective denoised image, the method further comprises providing S20 said pair of images to a pre-trained CNN architecture. Convolutional Neural Networks (CNN) architectures are widely known in the art and have been applied to a wide range of applications. A standard reference for Convolutional Neural Networks is Lecun, Y., Bottou, L., Bengio, Y., & Haffner, P. (1998), *Gradient-based learning applied to document recognition*. As known from the field of neural networks, a CNN architecture comprises an image feature extractor and/or an image fully connected classifier layers, each of the image feature extractor and/or image fully connected classifier layers comprising layers, wherein features may be output from one or more layers of the image feature extractor. The pre-trained CNN architecture is similar to the one the formed dataset will be configured for. By similar it is meant that the pre-trained CNN architecture comprises at least one common layer with the image feature extractor of the CNN architecture that will be learnt based on the formed dataset. By common layer it is meant a layer providing a same output for a same input. The common layer(s) is (are) those used in the computing S30. The pre-trained CNN architecture may be trained by any dataset of images known in the art and not further detailed. In examples, the pre-trained CNN architecture may be pre-trained based on the dataset ImageNet.

The method further comprises computing S30 a difference between a first normalized feature of the denoised image and a second normalized feature of the reference image. The first and second normalized features are the output of a same layer of the pre-trained CNN architecture. By "normalized" it is meant that the numeric values of the output of the layer corresponding to the feature are adjusted (e.g., re-scaled) with respect to the magnitude of the same numeric values. In other words, the normalization considers the features, prior to computing the difference, thereby giving a same weight to the numerical values of the features extracted from the denoised image and the reference image. Hence, the denoised image and the reference image are input to the pre-trained CNN architecture, and features are extracted by each layer of the image feature extractor of the pre-trained CNN architecture. The difference is thus computed from the features output by one or more layers of the image feature extractor, rather than by direct difference between the denoised image and the reference image.

The method further comprises computing S40 an error map representing the computed difference. The error map is an arrangement of values, e.g., a two-dimensional value, wherein each element is a numerical value corresponding to the difference between the first normalized feature of the denoised image and the second normalized feature of the reference image. By convention, the error map may establish the computed difference as the difference of the first normalized feature with respect to the second normalized feature of the reference image. Thus, each value within the error map represents a distance of non-respect of the second normalized feature of the reference image by first normalized feature of the denoised image. Thus, the error map can be interpreted as a measure of how well the denoiser preserves the detail, according to the respective feature of the reference image.

The method further comprises adding S50 the respective denoised image and the error map to the dataset. The method thus adds the respective denoised image and the error map to the data structure containing the dataset. More and more training examples comprising the respective denoised image and error map are added to the dataset for every pair of provided images. The method may form the training examples from at least the respective denoised image and error map. In examples, the method may add further annotations or additional data to the training examples. Thus, the dataset is formed of pairs of denoised images annotated with a corresponding error map, indicating how well detail in the denoised image is preserved, thereby indicating how well the denoiser preserves detail.

The method thus leverages from the capabilities of convolutional neural networks to form a dataset which identifies areas of degradation generated by a denoiser. This is thanks to the error map defining a metric based on the normalized features output from the pre-trained CNN architecture. The normalized features are particularly accurate for identifying small areas degraded by the denoiser. For example, the normalized features detect small structures that are blurred out by the denoiser, like leather textures. The normalized features are particularly accurate to detect objects of the ray traced image that are located farthest from a camera perspective in the scene of the ray-traced image and that have been blurred by the denoiser.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a dataset. The memory is any hardware adapted for such storage, possibly comprising several physical distinct parts (e.g., one for the program, and possibly one for the dataset).

The ray-traced image may consist of a scene comprising one or more modeled objects that may have been designed with a CAD system or may result from design made with a CAD system. By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g., representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 2:
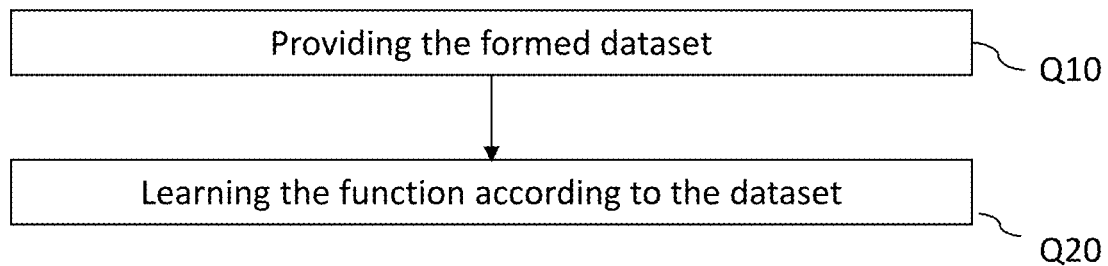

FIG. 2 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g., change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 3:
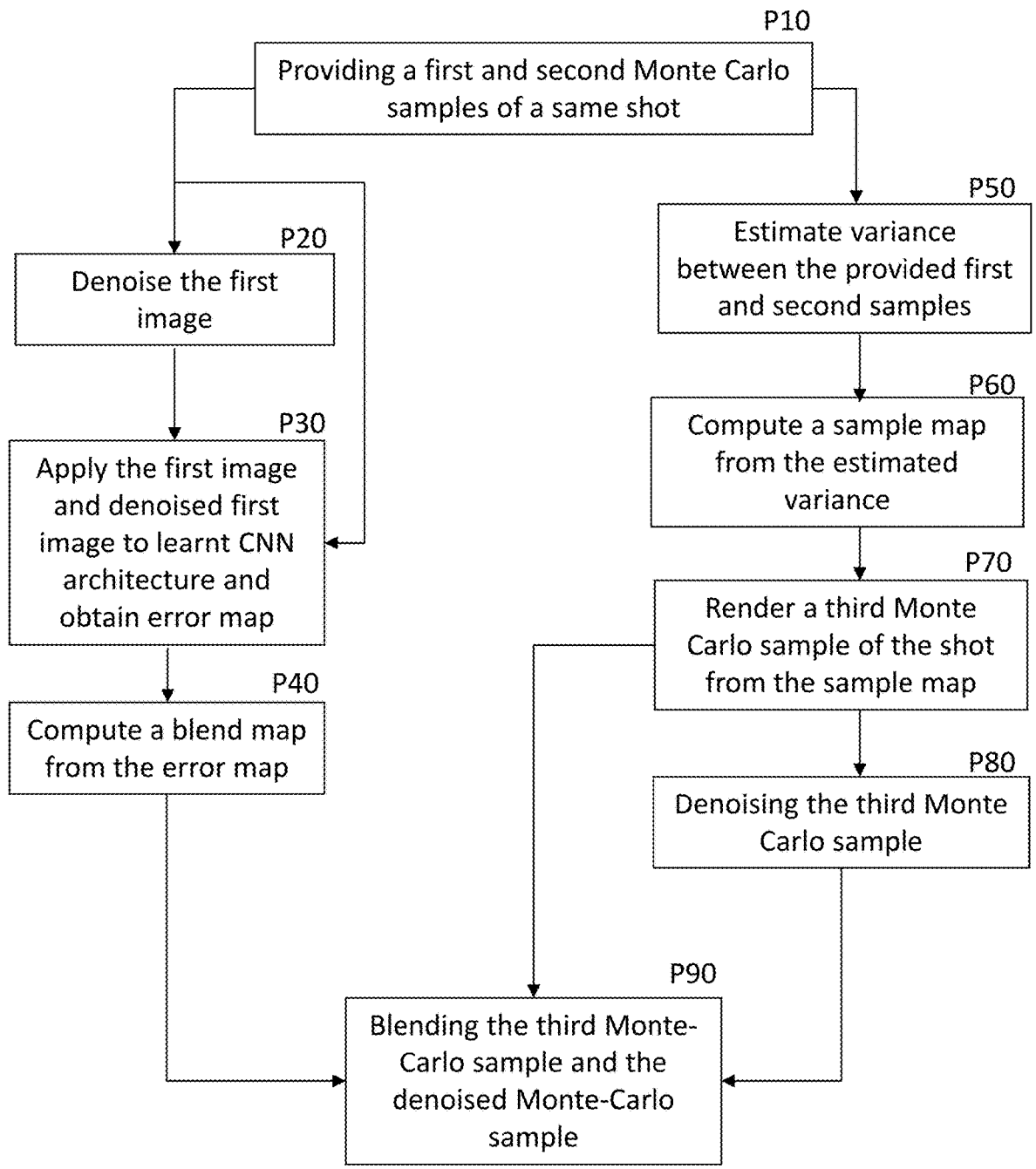
Figure 4:
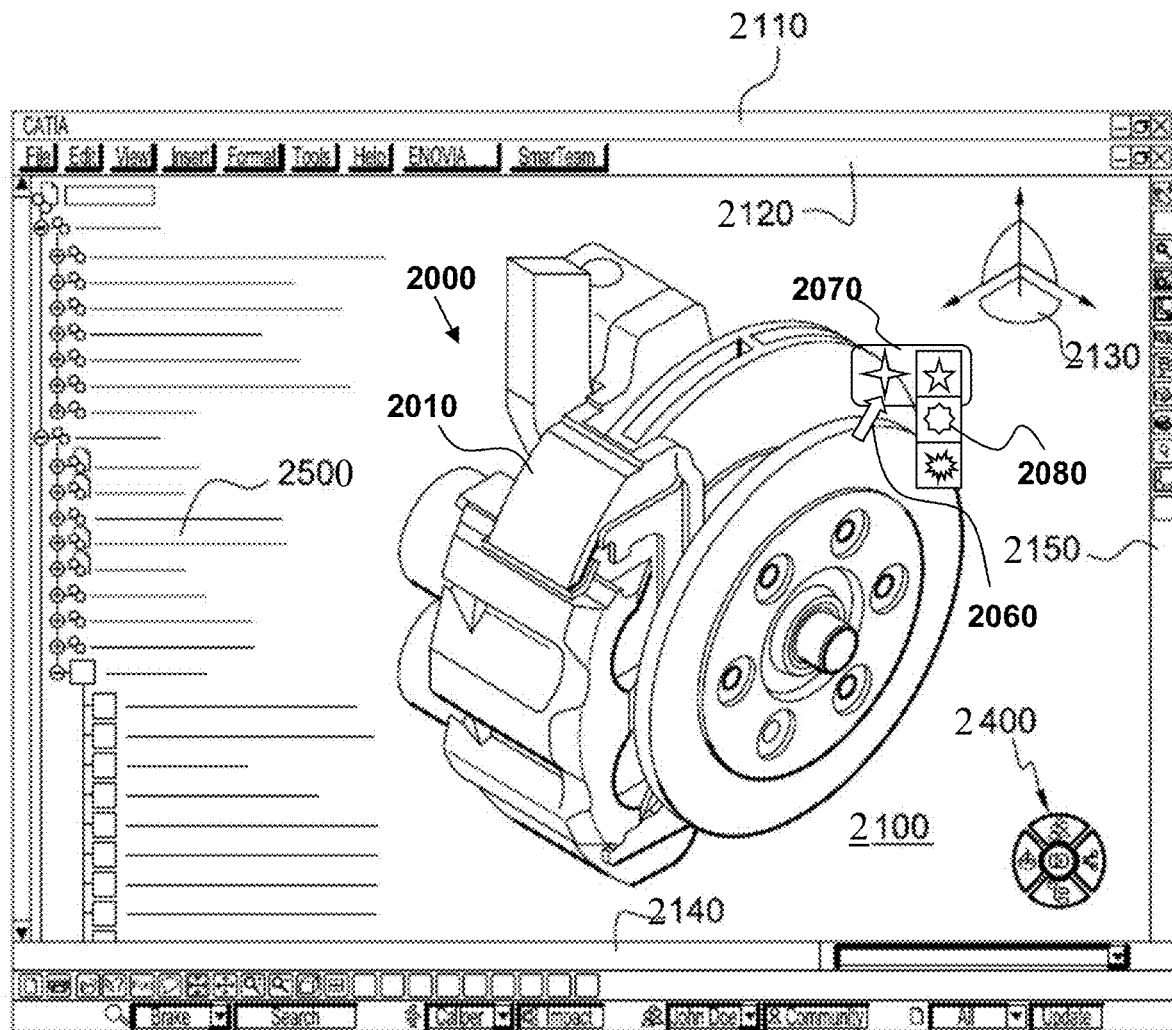
FIG. 4 shows an example of a graphical user interface of the system.
Figure 5:
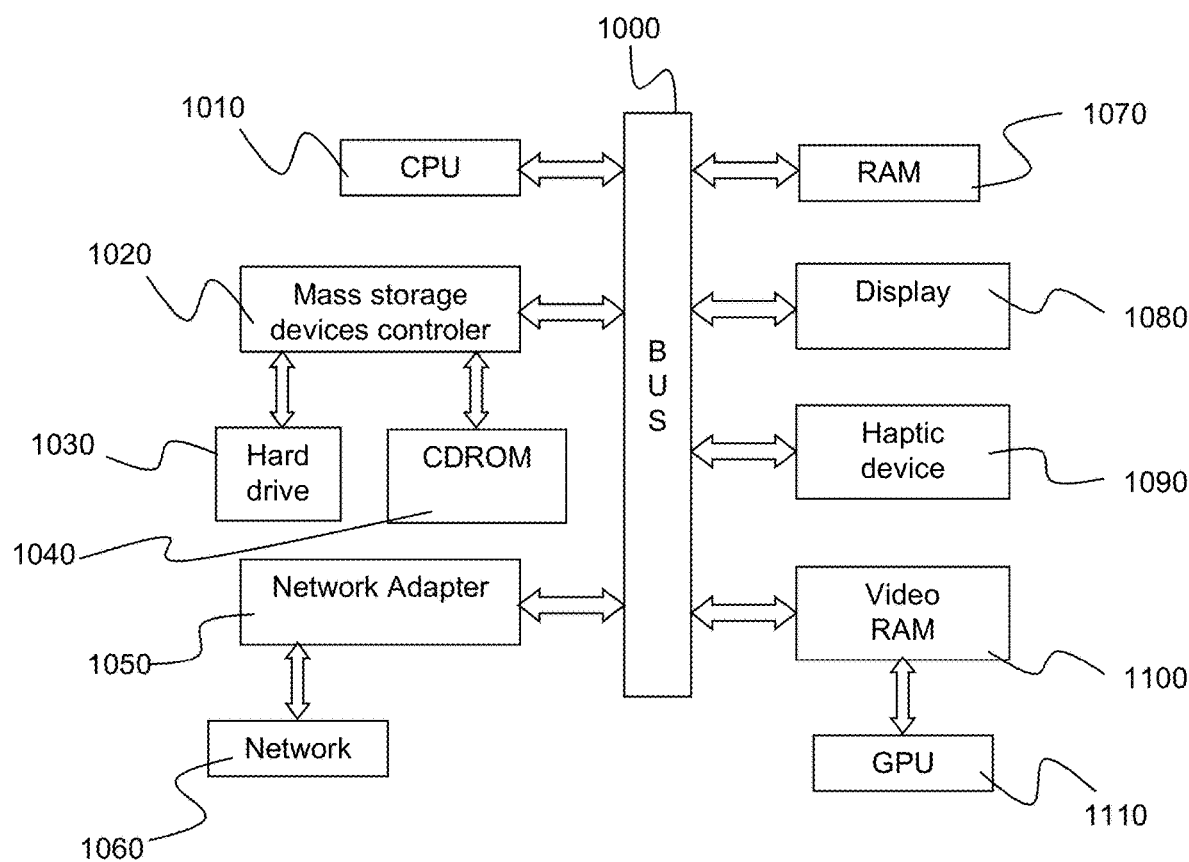
FIG. 5 shows an example of the system.
Figure 6:
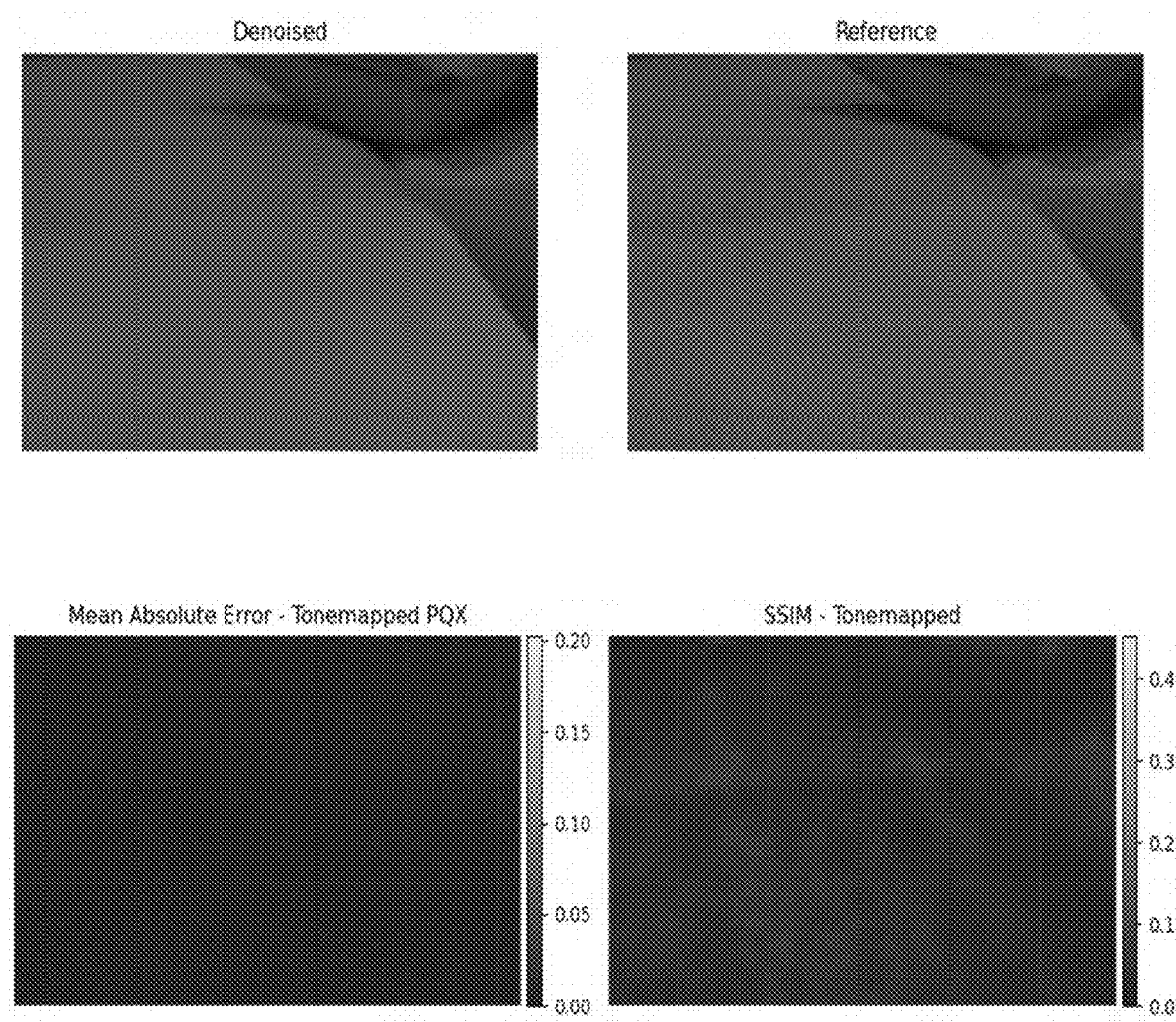
FIGS. 6 and 7 show the detection of denoising error by prior art methods.
Figure 7:
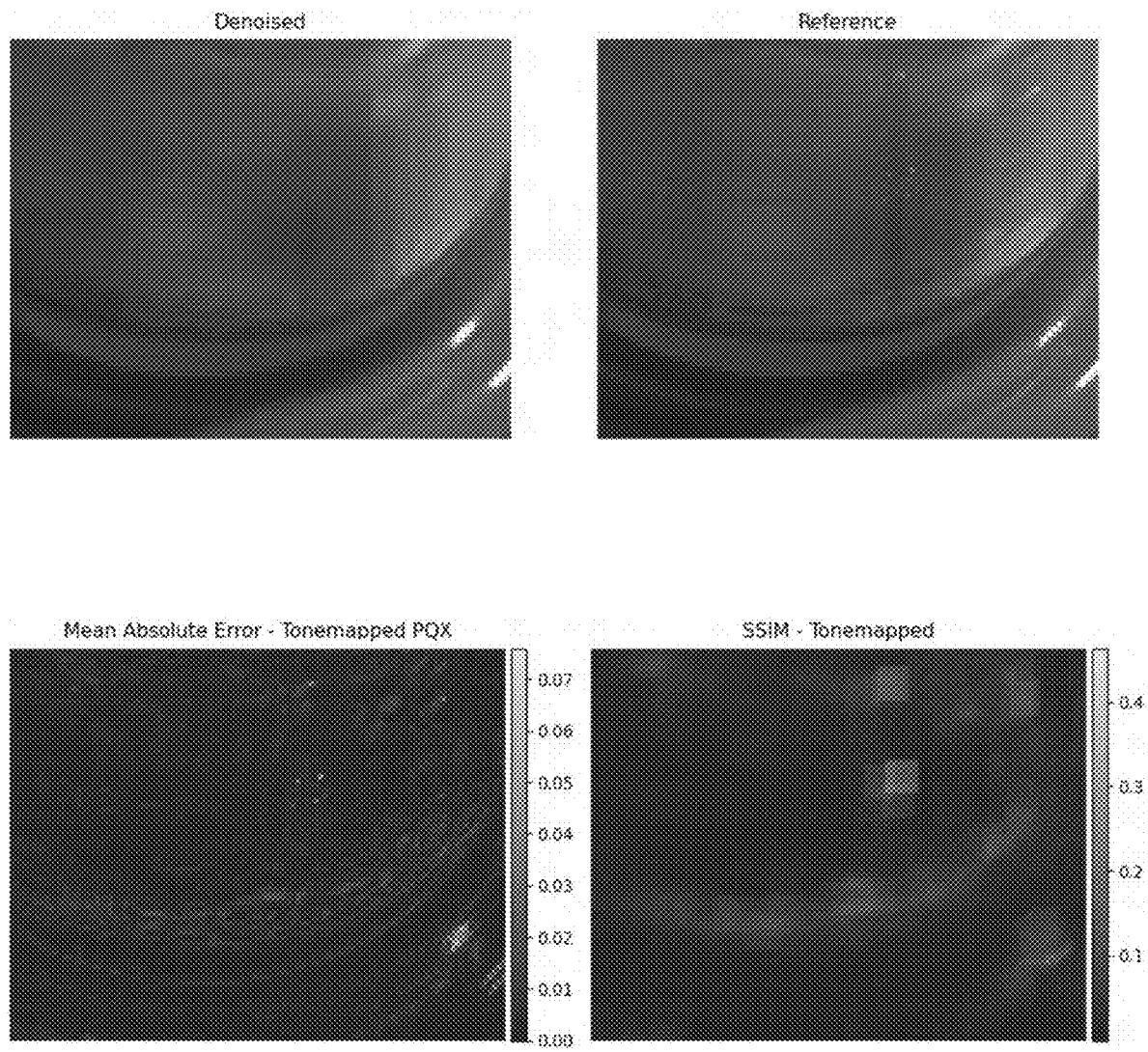

FIG. 3 shows an example of the system, wherein the system is a client computer system, e.g., a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, especially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to FIG. 1, the flowchart of the example of computer-implemented method for forming the dataset is further discussed.

The images of the provided pairs of images at step S10 may be ray-traced images. A ray-traced image may comprise a scene with one or more objects. The ray-traced image may comprise different objects or phenomena, for example, a camera model determining how and from where the scene is viewed. The ray traced images are rendered using Monte-Carlo techniques. As widely known by the art, Monte-Carlo rendering is based on numerical integration using random samples of a corresponding rendering equation. For example, the rendering equation describes the amount of light that reaches the camera (in a camera model comprised in the example) from a point on an object of the scene as the sum of light emitted by the object (if it is itself a light source) and the amount of reflected light by the object. The random samples may be set from a predetermined number, for example, a positive integer n. The Monte-Carlo renderer would perform n sampling steps, e.g., as an iterative process where at any step s, with $0<s<n$, a sample is obtained. As known from the field of Monte-Carlo rendering, increasing the number of samples makes the Monte-Carlo rendering more accurate; as the number of steps increases, the Monte-Carlo rendering converges to the ideal image corresponding to the exact solution of the corresponding rendering equation, that is to say, the Monte-Carlo samples converge to the underlying distribution of the corresponding rendering equation. For example, let s and s' be two numbers such that $0<s<s'<n$, then a ray-traced image obtained with s Monte Carlo samples is less detailed (i.e., less converged) than a ray-traced image obtained with s' Monte-Carlo samples. The specific way the samples are obtained is not the subject of the disclosure and is just discussed for illustration. For example, the ray-traced image obtained with s Monte-Carlo samples would have more noise in areas corresponding to objects far from the camera, or distort areas of the image having fine structure, such as leather structure or text in the image. As the small details and/or far objects have a high variance, a denoiser would degrade the corresponding areas. For example, such degradation may be a blurring of the fine structures of the image, or loss of detail of the objects far from the camera.

A "reference image" is a Monte-Carlo rendered ray-traced image sampled substantially close to the underlying distribution to reduce the variance. By "substantially close" it is meant that the system may determine, via a predetermined criterion, that the underlying distribution of the corresponding rendering equation of the image is approximated substantially by the discrete distribution obtained via the Monte-Carlo sampling. In turn, the variance of the distribution of the discrete reference image with respect to the corresponding rendering equation is substantially small. A "respective denoised image" is another Monte-Carlo ray-traced image which is the result of inputting to a denoiser, another image being sampled from the same corresponding rendering equation of the reference image. In specific, the number of samples of the other image is less than or equal to the number of samples of the reference image. The other image is also referred to as noised image of the reference image. For example, a noised image may be obtained by sampling s=512 samples and its corresponding reference image may be obtained by sampling s=131,072 samples or more.

Once the pairs of images have been provided, the method computes a dataset of the denoised images. The next steps of the method are done for each pair of images of the provided pairs of images. The method provides S20 the pair of images to a pre-trained CNN architecture similar to the one the formed dataset will be configured for. By "similar" it is meant that the pre-trained CNN architecture comprises at least one common layer with the image feature extractor of the CNN architecture that will be learnt based on the formed dataset. By common layer it is meant a layer providing a same output for a same input. The pre-trained CNN architecture may comprise all of the common layers with the image feature extractor of the CNN architecture that will be learnt based on the formed dataset. As known from the field of neural networks an "image feature extractor" is comprised of a set of layers, each layer of the set being configured to output a feature of the corresponding input image. A feature (also known as feature map) of the corresponding input image is known from the field of neural networks, in particular convolutional neural networks, and corresponds to a two-dimensional arrangement having values which corresponds to the output of the corresponding layer. A feature may be represented by an image according to the values of the two-dimensional arrangement, i.e., a matrix. Each value corresponds to a feature value extracted by the corresponding layer. For example, a layer may apply convolution operation to the input image, or to the output of another layer. The output of the convolution operation (in examples, usually a convolution with a filter matrix) corresponds to the feature map. By "image fully connected classifier" it is meant a layer of the CNN architecture that takes as input the feature maps output by the image feature extractor, and outputs a label for the corresponding image.

Figure 9:
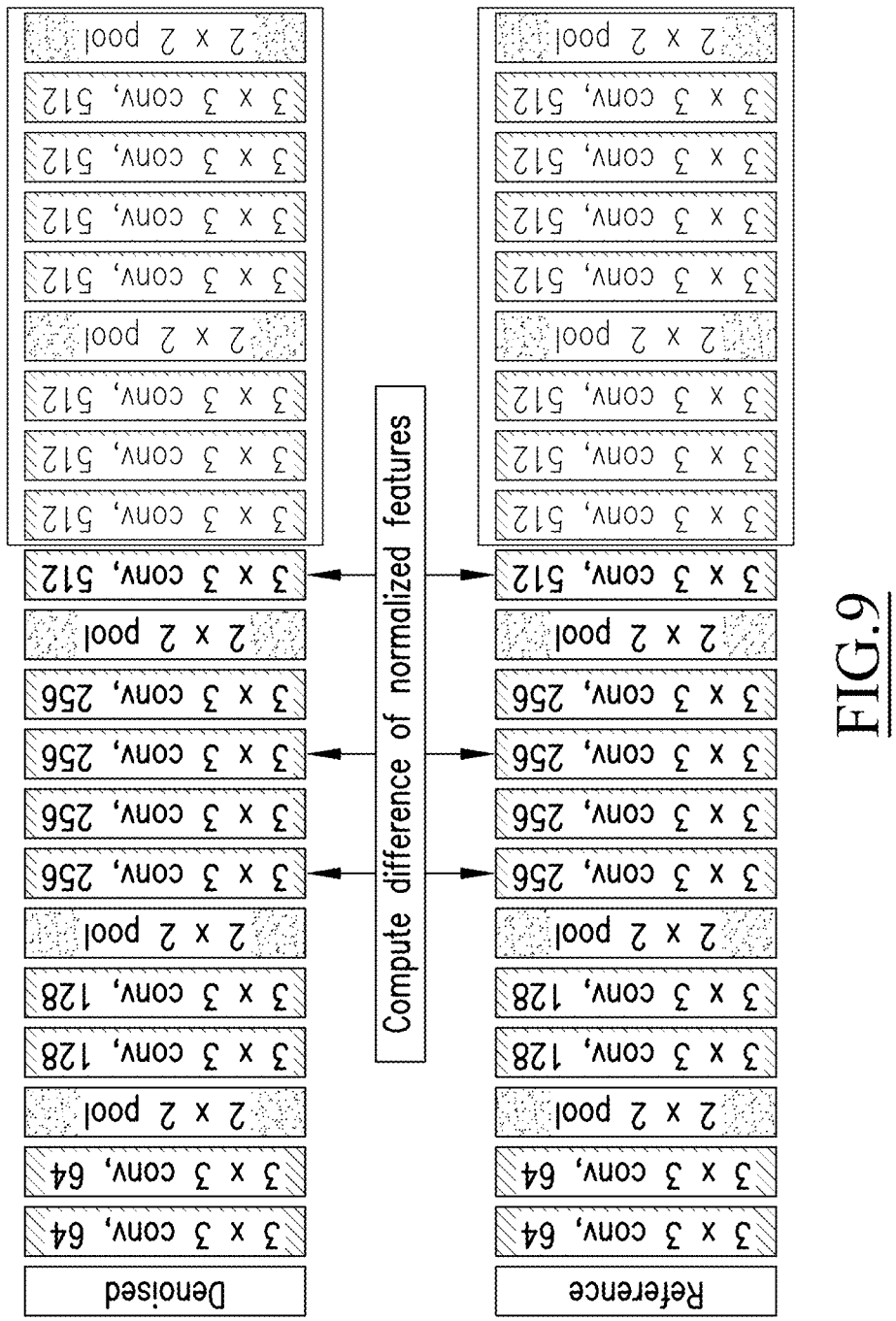
FIG. 9 shows an example of a pre-trained CNN architecture.
Figure 10:
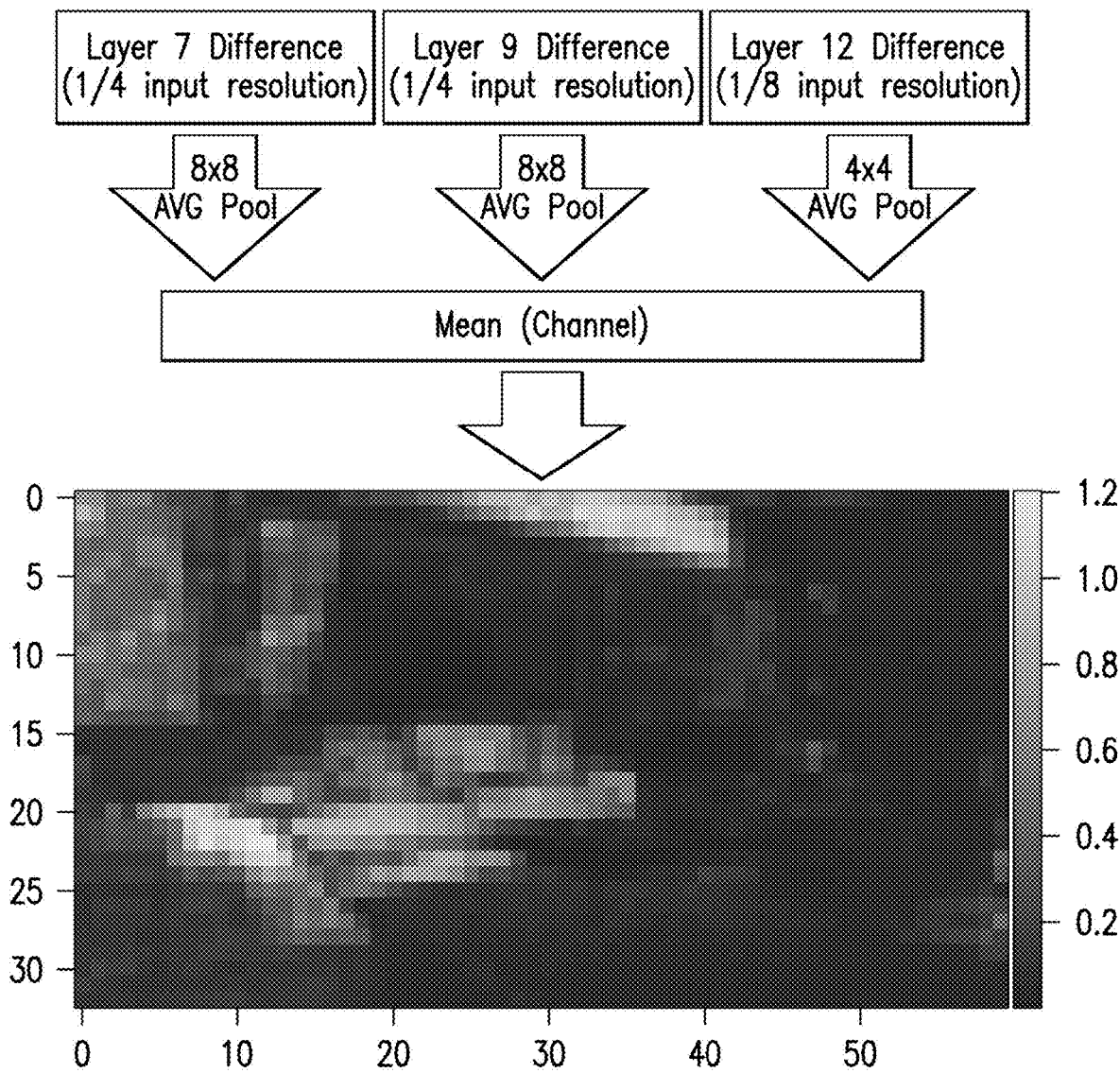
FIG. 10 shows an example of a coarse error map.

Next, the method computes S30 a difference between a first normalized feature of the denoised image and a second normalized feature of the reference image, the first and second normalized features being the output of a same layer of the pre-trained CNN architecture. The difference may be any difference between the numerical values of first normalized feature map and the second normalized feature map, corresponding to the same layer. For example, the difference may be computed, e.g., using Euclidean distance between the matrix values of the features, or any other distance metric, like absolute norm. FIG. 9 shows an example of the difference between a first normalized feature of the denoised image and a second normalized feature of the reference image by obtaining outputs of layers of a pre-trained VGG-19 CNN architecture. The denoised image is input to the pre-trained CNN architecture. Each layer of the pre-trained CNN architecture extracts a feature. The seventh layer from the right of the input image outputs a feature map of the reference image consisting of 256 channels wherein the x direction is ¼ the resolution of the input image, the y-direction is ¼ the resolution of the input image. The same seventh layer from the right outputs a second feature of the reference image. The two outputs are normalized prior to computing the difference, which is identified in FIG. 9 with the green section in the middle. For example, the difference of normalized features output from the seventh layer may further include the difference of other normalized features output by other layers, such as the $9^{th}$ layer, which outputs a feature map of the reference image consisting of 256 channels wherein the x direction is ¼ the resolution of the input image, the y-direction is ¼ the resolution of the input and/or $12^{th}$ layer, which outputs a feature map of the reference image consisting of 512 channels wherein the x direction is ⅛ the resolution of the input image, the y-direction is ⅛ the resolution of the input image. Optionally, if the layers have different resolutions, an average pooling may be applied to set the outputs of the layers to the same resolution. FIG. 10 shows an example of the resulting error map (computed in step S40) that applies an average pooling after computing the difference and before computing the error map.

Next, the method computes S40 an error map representing the computed difference. The error map may be an image, each pixel of the image having a color value, wherein each color value corresponds to the computed difference between values of the first normalized feature and the second normalized feature, corresponding to the output of the same layer. The error map can thus be considered as a map indicating how well the denoised image respects the reference image, in terms of its respective first and second normalized features. Thus, a lower error, corresponding to a small difference, corresponds to a better agreement between the denoised image and the reference, thereby indicating that the denoiser preserves enough detail after the denoising process. By convention, the error map may consist of non-negative values, wherein large positive values correspond to a large difference, whereas a small value would have a small non-negative value. A value of an error map having zero value would consist of a zero value, or any minimal value chosen by convention. For example, the pixels of the error map may have grayscale values, with 0 corresponding to no error, and 255 corresponding to the maximum difference. Any other color-scale may be defined by convention. The difference may be unbounded, but the method may always map values above a threshold value to the maximum value allowed by the color-scale, this is just a matter of implementation.

The method next adds S50 the respective denoised image and the error map to the dataset. The dataset is configured for learning a CNN architecture the estimation of errors due to denoising, wherein the learning is performed based on the error maps corresponding the corresponding denoised images. The added training samples of the dataset represent the diversity of situations where CNN architecture is applied after being learnt, i.e., in its corresponding online application after an offline training. The error maps in the dataset thus learn the CNN architecture to discriminate areas of the denoised image that are degraded by the denoiser, wherein the areas having a higher degradation correspond to the set of values of the pixel map having a substantially high error. By substantially high error it is meant that the values of the pixel map are above some threshold, which may be established by convention. These areas may comprise fine structures or objects that are found far from a camera viewpoint, which may be better discriminated according to the diversity of the training samples. As known per se from the field of machine learning, the formed dataset impacts the speed of the learning of the CNN architecture and the quality of the learning, that is, the accuracy of the learnt CNN architecture to estimate an error map. The dataset may be formed with a total number of data that depends on the contemplated quality of the learning. This number can be higher than 1.000, 10.000, or yet 100.000 elements. The quantity of the data in the dataset follows a tradeoff between the accuracy to be achieved by the CNN architecture, and the speed of the learning. For example, 500 pieces of data would correspond to a fast learning, whereas 100.000 would provide a high quality of the learning. In other example, approximately 2500 pieces of data are needed to learn a CNN architecture in 24 hours, wherein the learning is performed by supervised learning.

In examples, the spatial resolution of the error map may be adjusted to improve the detection of areas where the denoiser degrades an image. Computing S40 the error map representing the computed difference may comprise first down-sampling the resolution of the computed difference and then computing the error map with the down-sampled resolution of the difference, wherein each pixel of the error map has a color following a color scale that penalizes the computed difference. The spatial resolution of the error map is thus reduced, thereby the obtained error map is a coarse error map. The error map may be down-sampled by any known means, for example, using an averaging pool. Thus, a CNN architecture learnt based on the dataset formed by the method is better suited for finding areas of loss of detail. Indeed, a high spatial resolution map may contain very small spatial variations between areas having a high and low error, i.e., few pixels of the error map showing a color with high error surrounded by a plurality of pixels showing low or no error, according to the convention set by the color-scale. If the resolution of the image is too large, the CNN architecture may be more accurate, but it would need more samples to identify very small spatial variations of the error. In contrast, a coarse error map shows coarse spatial variations, i.e., the pixels with high error are averaged so that they make up a larger spatial area of the image, thus facilitating the learning of the CNN architecture. The down-sampling can be implemented in any way such that there is a good trade-off between accuracy and learning time of the CNN architecture.

In examples, the pre-trained CNN architecture may use any state-of-the-art CNN architecture, such as a Visual Geometric Group (VGG) architecture. CNN architectures comprise different layers, which may include convolutional layers, pooling layers, fully connected input layers, fully connected output layer or the like. The details of the composition of such CNN architectures is widely known and not further detailed. The different layers of the VGG architectures allow to extract information (i.e., features or deep features) from a corresponding input image.

Figure 8:
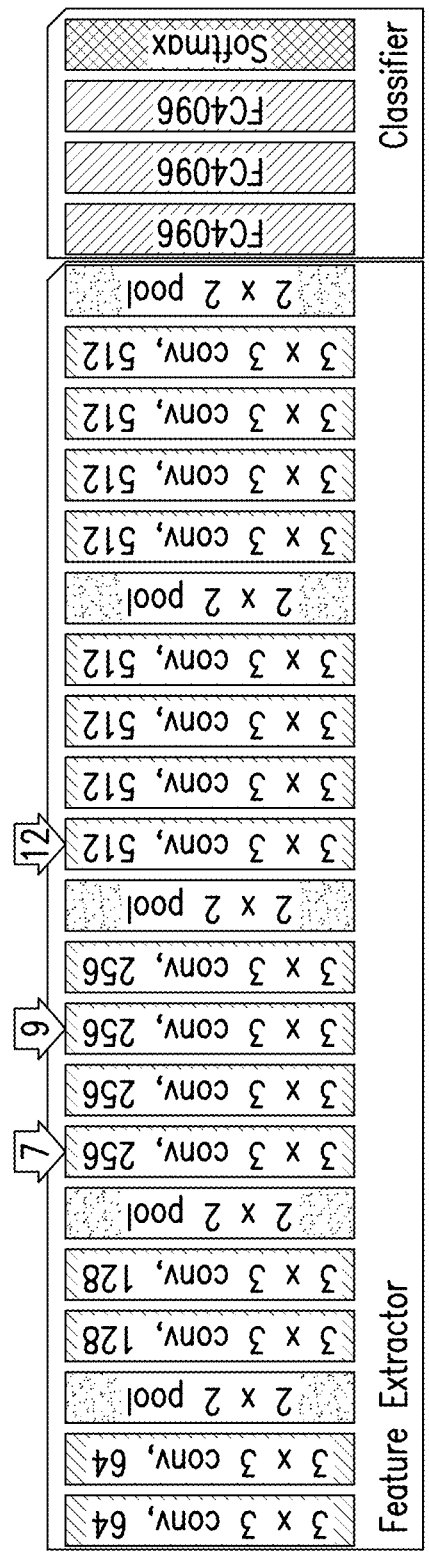
FIG. 8 shows an example of a CNN architecture.

In examples, good results were found with the pre-trained CNN architecture is a pre-trained VGG-19 architecture. The main architecture behind the VGG-19 neural network is described in paper Simonyan, K., & Zisserman, A. (2015). *Very Deep Convolutional Networks for Large-Scale Image Recognition*. The VGG-19 architecture may be pre-trained based on commonly available dataset, such as the image dataset ImageNet. FIG. 8 shows shows the main components of the VGG-19 architecture, which is a state-of-the-art architecture that leverages on improvements on convolutional neural networks; VGG19 is composed of 16 convolution layers (denoted as cony), 3 fully connected layers (denoted as FC), 5 maxpool layers (denoted as pool) and 1 softmax layer (denoted as Softmax). By convention, the layers are enumerated by convention from the leftmost layer to the rightmost layer depicted in FIG. 8. VGG-19 is particularly accurate obtaining features thanks to being pre-trained based on the image dataset ImageNet. Indeed, ImageNet is an image dataset organized according to nouns in the WordNet hierarchy, in which each node of the hierarchy is depicted by hundreds and thousands of images. ImageNet comprises an average of over five hundred images per node. The error map is thus computed from the difference between a first normalized feature of the denoised image and a second normalized feature of the reference image, the first and second normalized features being the output of a same layer of the pre-trained VGG-19 architecture. In examples, and referring to FIG. 9, the first normalized feature of the denoised image and the second normalized feature of the reference image are extracted from the 7th and/or 9th and/or 12th layers of the image feature extractor, the 7th and/or 9th and/or 12th layers being enumerated by convention from the leftmost layer to the rightmost layer depicted in FIG. 9. All of the layers grayed out are removed. In an example, the first normalized feature of the denoised image and the second normalized feature of the reference image are extracted from the 7th and 9th and 12th layers of the image feature extractor. The features are normalized to equalize the magnitude of the different layer outputs. For example, the layers of the image feature extractor of the VGG-19 architecture contain down-sampling steps, the spatial resolution of the 7th and/or 9th and/or 12th layers are different. Indeed, the $7^{th}$ and 9th layer both output a feature map of the reference image consisting of 256 channels wherein the x direction is ¼ the resolution of the input image, the y-direction is ¼ the resolution of the input, whereas the 12$^{th}$ layer outputs a feature map of the reference image consisting of 512 channels wherein the x direction is ⅛ the resolution of the input image, the y-direction is ⅛ the resolution of the input image. Thus, the error map may be down-sampled for each channel for a same resolution to obtain a coarse error map. FIG. 10 shows a coarse error map obtained by normalizing the features, and perform down sampling via averaging prior to computing the error map. The coarse error map shows the same weight to the output of the 7th and/or 9th and/or 12th layers, which were found to best identify the degradation between the reference image and the denoised image. The error map may be further down-sampled to provide a coarser error map and thus better identify the areas of degradation due to denoiser.

In examples, the method may further add S50 to the dataset, the respective denoised image, the error map, and a respective noisy image of the reference image. The noisy image is the one from which the denoised image has been obtained. Usually, it is an image with lower Monte-Carlo samples than that of a corresponding reference image, and thus presenting noise. The noisy image is provided to the denoiser to reduce the noise, and the denoised image is the result of the denoising process by the denoiser. The dataset formed by the method allows learning a CNN architecture to learn to estimate errors of denoised image, output by a denoiser, without accessing to the reference image. This is particularly important in real-world scenarios, where there is no access to a reference image, since obtaining it is computationally prohibitive.

Figure 15:
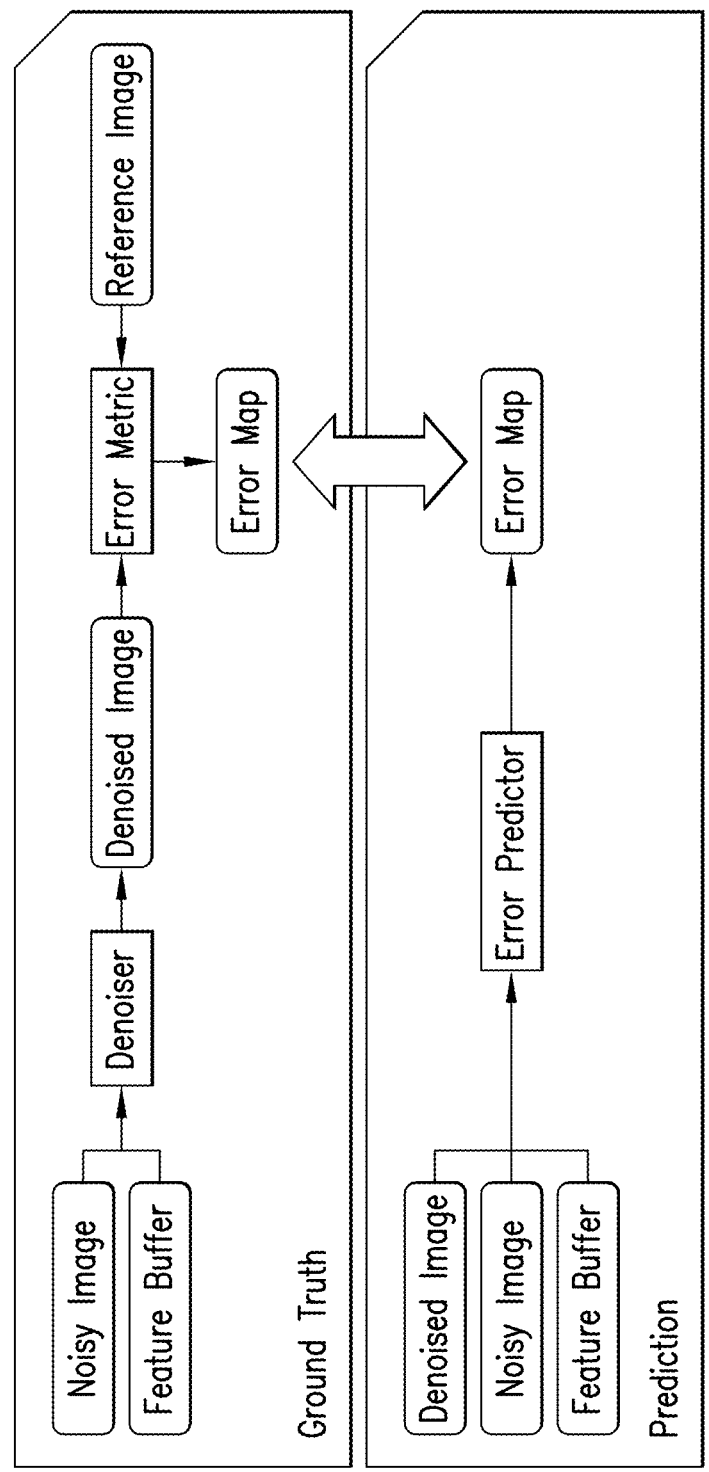
FIG. 15 shows an example of the CNN architecture learnt with supervised learning.

In examples, the method may further form a dataset appropriate for supervised training. The method may set least part of the data in the data structure of the dataset to be used as ground truth data, to be used for training in supervised mode. Reference is made to FIG. 15, which is a machine-learning process for supervised learning of a function. The upper part of FIG. 15 shows an example of ground truth data. A noisy image, obtained by Monte-Carlo rendering, and a feature buffer are fed into a denoiser to generate a denoised image. The denoised image and the reference image are provided to the dataset-forming method. The dataset-forming method outputs an error map, which is to be set as a ground truth data. The method may generate any quantity of ground truth data needed for the supervisory learning. The method may store the dataset in memory for later use in the same system, or to send it to another system. In an offline-learning, which can be performed in the same system or another system, a CNN architecture can be learn in supervisory fashion by comparing the output of said CNN architecture with the generated ground truth data.

Figure 13:
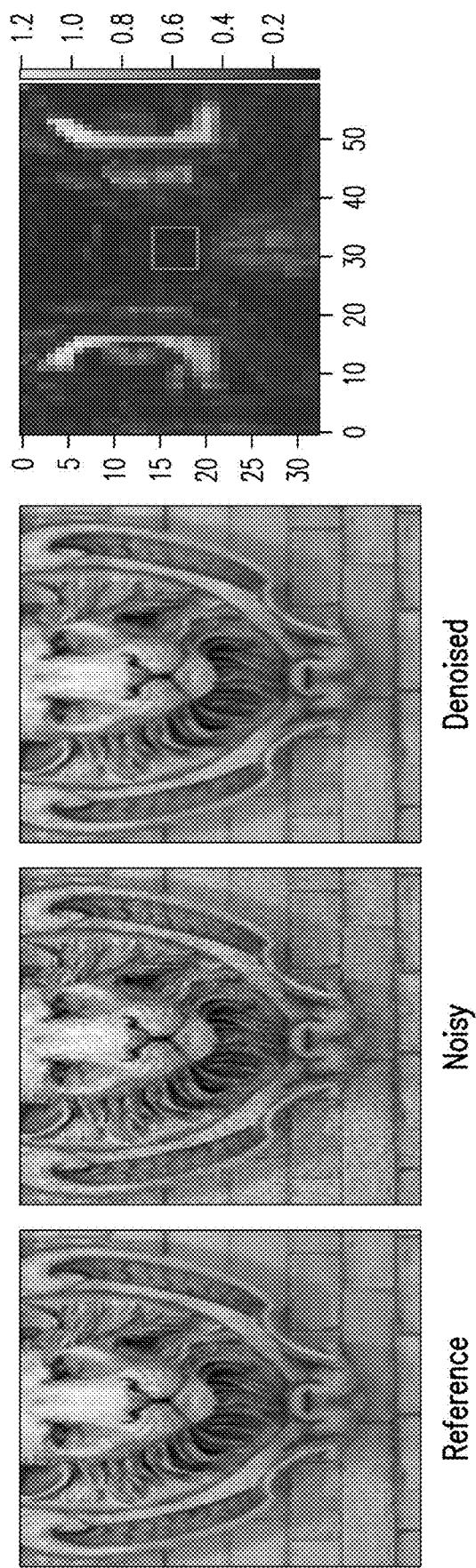

In examples, the respective denoised image is the result of inputting to a denoiser, another image being sampled from the same corresponding rendering equation of the reference image, wherein the number of samples is strictly less than the number of samples of the reference image. The user may input any number of samples strictly less than the reference image. Thus, the formed dataset may comprise pieces of data showing a relatively high variation in variance due to noise, thereby providing the CNN architecture that learns to distinguish the degradation by the denoiser in the several values of noise variation. The other image may be further be referred to as "noisy image". FIGS. 11-13 show examples of sets of images comprising a reference image, the corresponding noisy image, the denoised image, being the result of inputting the noisy image to the denoiser and the corresponding error map. For example, FIG. 11 shows a noisy image of a scene comprising several elements such as curtains on the side, and a sculpture in the end of the far end of the camera viewpoint. This particular example is a high count sample, thus making it difficult to verify degradation of the noisy image due to the denoising. The corresponding error map shows the degradation. FIG. 12 is a zoomed version of the same scene comprising the area of the curtain. FIG. 13 is a zoomed version of the same scene comprising the sculpture in the far end of the camera viewpoint.

In examples, the dataset-forming method may form a data structure representing the dataset. The formed dataset may thus be represented in a data structure. Said data structure may be stored in non-volatile memory or being transmitted as such to another computer system via a network, thereby allowing its posterior use. For example, the dataset can be organized as EXR Image files to allow High-dynamic-range (HDR) content stored on non-volatile memory, e.g., a disk, wherein data in the disk is organized by one folder per shot, with filenames containing descriptive postfixes to describe the content.

With reference to the flowchart of FIG. 2, it is further provided proposed a computer-implemented method for performing a learning, also referred to as "the learning method". The learning method uses the dataset obtained with "the dataset-forming method". The method comprises learning a convolutional neural network (CNN) architecture based on the dataset. The method comprises providing Q10 the formed dataset. The provided dataset may have been formed at different times, at different locations, with different systems and/or by different persons or entities. The method further comprises learning Q20 the CNN architecture based on the formed dataset. The learning Q20 can be performed by any means known by state-of-the-art CNN architectures to output error maps that estimate the loss of detail of the image generated by the denoiser with respect to its corresponding noise image, that was input to the denoiser.

In examples, the learning Q20 may comprise taking as input an image generated by the denoiser and its corresponding noisy image of the dataset and outputting an error map. The learning can be performed by any means known by state-of-the-art CNN architectures to output error maps that estimates the loss of detail of the image generated by the denoiser with respect to its corresponding noise image, that was input to the denoiser. The CNN architecture is thus learnt for estimating the degradation due to denoising, thanks to the provided dataset being configured so that the CNN architecture learns from the training samples for that purpose.

The CNN architecture learnt according to the method thus estimates the degradation generated by a denoiser with the contemplated accuracy of estimation intended by the quantity of the samples. Moreover, thanks to the variety of training examples provided by the formed dataset, the CNN architecture identifies areas of fine structural detail or zones comprising objects found far of a camera view.

In examples, the learning Q20 can be performed as a supervised learning. The learning thus further comprises using error maps as ground truth data for supervised learning. Notably, the learning may use error maps from the dataset provided at step Q10 as ground truth data. Since the dataset provided at step Q10 being formed from pairs of a denoised image and a corresponding reference image, the error maps are suitable ground truth data that reflects the loss of detail with respect to a reference. The CNN architecture can be learnt according to any means known in supervised learning, the specific learning process being an implementation detail. The ray traced image may comprise scenes, e.g., interior shots, product shots or close-up shots. The CNN architecture learnt according to the method thus detects problematic areas presenting loss of detail in the various scenes.

In examples, the CNN architecture being learnt by the learning Q20 is identical and has a same number of layers as the pre-trained CNN architecture. Since no other information, like other deep features, needs to be extracted but those from which the first and second normalized features are output, all the layers of the CNN architecture being learnt after the layer of the pre-trained CNN architecture having generated the first and second normalized features are removed. The VGG-19 architecture allows for an efficient machine learning process, which is described in examples hereunder.

Figure 14:
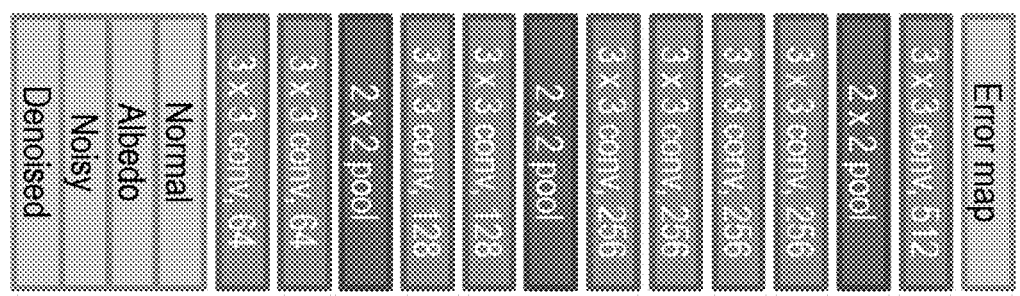
FIG. 14 shows an example of the CNN architecture used for learning.

Examples are explained with reference to FIGS. 9, 14 and 15, showing respectively the pre-trained CNN architecture, the CNN architecture to be learnt according to the learning method and an example machine learning process. The pre-trained CNN architecture used for forming the dataset according to the dataset-forming method and the CNN architecture to be learnt to estimate degradation due to denoising are based on the VGG-19 architecture. FIG. 15 shows the machine learning process comprising the learning method process (Prediction section) based on a dataset formed by the dataset forming method (Ground truth section). The pre-trained CNN architecture used for forming the dataset and the CNN architecture which is learnt by the learning method are both VGG-19 architectures being identical and having the same number of layers. The pre-trained VGG-19 architecture in this example is setup as explained above and not further detailed.

Referring to FIG. 14, the CNN architecture—being learnt for estimating the degradation generated by the denoiser—uses the same layers of the pre-trained VGG-19 architecture, without the addition of a normalization stage, and is learnt in supervisory fashion based on the ground truth data set by the provided dataset. In this particular example, the CNN architecture further takes as input an albedo and normal buffer. This is to be understood as a choice of implementation.

In the following, it is now discussed an example of the learning method using the dataset obtained with "the dataset-forming method". The CNN architecture may be learnt to estimate a degradation generated by a denoiser on a ray-traced image. The learnt CNN architecture may thus be referred as well as an "estimator architecture" The learning may be based on the formed dataset. The estimation of the degradation may be represented by an error map that discriminates areas where the image of the denoiser presents loss of detail, e.g., fine elements being blurred out. The learning Q20 comprises taking as input an image generated by the denoiser and its corresponding noisy image of the dataset. The dataset is obtained in accordance with former examples. The learning further comprises outputting an error map.

The estimator architecture being learnt according to this example is thus particularly fast for estimating a degradation generated by a denoiser on a ray traced image, compared to other online optimization procedures. This is thanks to the estimator architecture being learnt first in an offline stage, and then simply applied in an online stage without further optimization. Moreover, the error maps output by the estimator architecture estimate accurately the degradation generated by the denoiser without the use of a reference image. Indeed, as the provided dataset includes the denoised images and the corresponding error map, the estimator architecture learnt according to the learning method thus estimates small/and or thin structures that are lost due to the denoiser, and detect objects that are far from the camera perspective in the scene.

In examples, the estimator architecture being learnt according to this learning method further takes as input, for each denoised image of the dataset, an albedo map and a normal buffer. The number of input channels is thus the same inputs that state-of-the-art denoiser systems use. The method is thus able to find loss of detail in fine structures. Indeed, as known in the art, the albedo and the normal buffer are normally used by the denoiser to better preserve detail, thus, the learnt CNN architecture may estimate any further loss of detail caused by the denoiser.

In examples, the estimator architecture may be learnt as a supervised learning. The learning thus further comprises using error maps as ground truth data for supervised learning, as discussed previously. The estimator architecture can be learnt according to any means known in supervised learning, the specific learning process being an implementation detail. The ray traced image may comprise scenes, e.g., interior shots, product shots or close-up shots. The estimator architecture learnt according to the method thus detects problematic areas presenting loss of detail in the various scenes.

In examples, the estimator architecture is identical and has a same number of layers as the pre-trained CNN architecture. All the layers of the estimator architecture that are after the layer of the pre-trained CNN architecture having generated the first and second normalized features are removed. Thus, estimator architecture has the same number of layers as the pre-trained CNN architecture, which saves computational time compared to performing the learning by including more layers.

In examples, good results were found when the estimator architecture is a VGG-19 feature extractor, comprising layers 0 to 12. The dataset formed by the dataset-forming method may comprise thousands of shots (i.e., training samples), each shot containing various objects a scene under different lighting scenarios with all kind of structural details. For example, the objects in the scene may comprise leather, carpets, stonework, wallpaper, rough metal, metal floor or plastic objects having fine details. Each shot may comprise a reference image, a denoised image and an error map. In examples, the VGG-19 feature extractor is trained in supervisory manner, as known in the art. Best results are found when the VGG-19 feature extractor further comprises as inputs an albedo and normal buffer.

With reference to the flowchart of FIG. 3, it is now discussed a method of use of the estimator architecture. The method of use denoises adaptively a ray-traced image, using the learnt estimator architecture. The essential idea is to sample a ray-traced image with a first number of samples and estimate the variance to compute a sample map that indicates how many samples are needed to reach a certain level of detail. The application of the sample map is performed base on a blend map, which indicates areas of the image not being converged enough, in the sense of Monte Carlo sampling. This is performed through the computation of a blend map that discriminates the areas of the image that are not significantly converged, according to a target signal-to-noise decibel level. Next, a sample map establishes the number of samples necessary to achieve a better detail for the areas having a high signal-to-noise decibel level, with respect to the blend map. The method of use is further explained hereunder.

The method comprises providing P10 a first and second Monte-Carlo ray-traced images rendered from a same shot.

By shot it is meant a ray-traced image that comprises a scene with one or more objects, to be rendered using Monte-Carlo techniques. The first Monte-Carlo ray-traced image is different to the second one; different means that both first and second Monte-Carlo ray-traced image are rendered from the same shot but by using different sampling processes, for example, by setting different initial conditions (e.g., random seeds), or different number of samples, or different sampling strategies. As known per se from the field of Monte-Carlo methods, the sampling process of an image is random, i.e., the way the samples of the rendering equation of the shot are obtained follows a probabilistic (i.e., non-deterministic) criterion. Therefore, the images present different areas presenting noise, due to the sampling processes being performed differently. The Monte-Carlo samples may be obtained by any known sampling process, e.g., uniform sampling from a random seed. The system may obtain the two images by any method known in the art. The system may perform Monte-Carlo samples from a corresponding shot, based on a rendering equation of the shot stored in non-volatile memory. For example, the system may be configured to perform Monte-Carlo rendering for the first image, and in a separate process in the same system, perform Monte-Carlo samples for the second image. It is to be understood that this is only a choice of implementation. Alternatively, the first and second images may be obtained from non-volatile memory or by reception as such from another computer system, e.g., via a network. Due to the different sampling, the first and second images present noise in different areas; the method uses the first and second images to estimate how many samples are required to reach an appropriate quality of the shot as will be further explained in the steps of the method of use.

The method of use further comprises providing P20 a first denoised image of the first image. Any known denoising method known in the art may be used. Next, the first image and the first denoised image are applied to the learnt estimator architecture so that, an error map P30 is obtained. Each pixel of the error map presents a color indicating an error due to the denoising, wherein the error is estimated by the estimator architecture. The error map may comprise areas of a same error, i.e., sets of contiguous pixels in the error map having the same (or substantially the same) value. For example, the error map may be a coarse map that averages error maps, thus providing larger areas than a fine map.

The method of use further comprises computing P40 a blend map from the obtained error map. The blend map represents a signal-to-noise decibel levels for each area of the error map. As known in the art, the loss of detail is directly related to the signal-to-noise ratio of the image. A large error due to denoising corresponds to a low signal-to-noise-ratio, while a low error corresponds to a high signal-to-noise ratio. The blend map thus indicates the decibel levels of the areas corresponding to the error map resulting from the denoising. For example, the blend map may represent peak signal-to-noise ratio decibel values computed from a target root-mean-square-error, e.g., by using the formula $-20*\log 10(rmse)$, wherein rmse represents the target root-mean-square-error. The system may pre-define the target root-mean-square-error. Thus, the blend map represents a plurality of areas in the blend map having decibel values below the desired signal-to-noise decibel values needed achieve an accurate image. The system may thus define a weighting blend according to the signal-to-noise decibel values present in the blend map.

Next, a variance from the first and second images is estimated P50. The variance may be estimated by any means from the first and second images. The first and second image are generated from different sampling processes thus presenting noise in different areas due to the random properties of Monte-Carlo sampling. The areas presenting noise in the first and second images may have any degree of intercorrelation, e.g., the areas may be independent (in a probabilistic sense) or substantially correlated. The variance estimates the noise from the combination of the first and second images. For example, the variance may be computed from the image resulting from (first image+second image)/2.

From the estimated variance from the first and second images, the method of use may further compute P60 a sample map. The sample map indicates the number of Monte-Carlo samples required to reach a signal-to-noise decibel level required to achieve an appropriate quality. The signal-to-noise decibel level may be set by the user or the system. The sample map may be computed by using the estimated variance and Monte-Carlo convergence properties. The system may determine the number of samples remaining to reduce the variance between the first and second images by any means known in the art that use the Monte-Carlo convergence properties. The number of samples required to reach a signal-to-noise decibel level may be higher, e.g., substantially higher, than the samples that were performed for rendering the first and second images.

The sample map is next used to render P70 a third Monte-Carlo ray-traced image of the shot. The third image is rendered with a number of Monte-Carlo samples identified from the sample map. The third image is sampled according to the samples required to reach a signal-to-noise decibel level. Thus, the third image sampled is more detailed than the first and second image, and the detail is added in a particularly efficient manner. Indeed, as the sampling is performed according to the number of samples required to reach a signal-to-noise decibel level, the method only concentrates on adding samples on areas where it is needed to reach the signal-to-noise decibel level indicated by the sample map. This is particularly more efficient compared with other sampling methods, e.g., uniform sampling, wherein the sampling is performed uniformly in the domain of the image and thus there may be samples performed where there is no need to further add detail.

The third image is next provided P80 as input to a denoiser, thereby obtaining a corresponding denoised image.

The obtained denoised image, corresponding to the third image, is blend P90 with the third image. The third image has better detail than the first image, but still requires denoising. The blending now will be performed to only blend parts with the denoised image that are not so noisy, according to the signal-to-noise decibel levels. This is performed according to the blend map. Indeed, the blending is weighted for each area of the blend map that has a signal-to-noise decibel levels higher than a threshold. For example, the method may blend areas having decibel values higher than 40 decibels; the method may not attempt blending below that threshold, since the first denoised image would be too noisy to provide acceptable results. The threshold may be set in accordance to the expected quality, this is just a choice of implementation.

The method of use thus improves the denoising process to increase the quality of the ray-traced image without involving the high computational cost of rendering a high-resolution image or a reference image, as the denoising process is improved as to only denoise areas that do not suffer from quality loss when denoising. Indeed, the method of use detects problematic areas in the image via the error map, thus the method of use focuses on adaptively distributing a high number of samples to areas that will not be denoised. User intervention is no longer needed, as the process is fully automatic, therefore avoiding the need of time-consuming manual inspection. Additionally, the rendering cost is also reduced, thanks to the more efficient distribution of samples, as computed from the sample map.

Due to the variability of the noise, the error map obtained from the learnt estimator architecture may present areas having large or even unbounded errors. In examples, the method of use may compute the blend map from the obtained error map by normalizing the error map. The normalization may be performed by applying a sigmoid function to the error map. As widely known in engineering, a sigmoid function is a bounded, smooth real function that is defined for all real input values. The sigmoid function takes as input the value of the error at each pixel of the error map, e.g., from the value corresponding to the color scale of the error map. The sigmoid function has a non-negative derivative at each point and one inflection point. The properties of the sigmoid function are used to map the unbounded errors as follows: any value mapped by the sigmoid function below the inflection point is a small value, which decreases substantially as the mapped value is further below the inflection point. Therefore, the sigmoid function attenuates substantially small noises. The extent up to which the small noises are attenuated depends on the definition of the inflection point, which can be adapted as known in the art. Large noises, e.g., unbounded noises, are those that are mapped above the inflection point. In this case, as widely known, the sigmoid function can be considered as a smooth saturating function that maps the large errors up-to the maximum value allowed by the sigmoid function. In examples, the sigmoid function may be chosen to normalize the values of the error in a bounded interval, e.g., in the interval [0,1]. In examples, a sigmoid function is a hyperbolic tangent function or a logistic function. Thus, the sigmoid function may map unbounded values to the bounded interval [0,1]. As unbounded values are mapped in the blend map, the blend map is well-defined in all its areas. The method computes the blend map by computing decibel values of each area of the error map from a target root mean square error between the normalized error map and a target error map. A blending threshold can be established by the user from the computed decibel levels. For example, areas having low signal to noise decibel levels are ignored since the area has too much noise. Areas having high signal to noise decibel levels can thus be discriminated and further improved. Therefore, the method of use can better focus on improving areas with low error.

In examples, the first image may be rendered with a first number of Monte-Carlo samples and the second image may be rendered with a second number of Monte-Carlo samples. By "rendered with" it is meant that the rendering is based on the first number or the second number, which may include further adaptation according to the choice of implementation of the sampling. The first number of Monte-Carlo samples may be larger or equal than the second numbers of Monte-Carlo samples. For example, the first and second numbers may be equal, however the samples provide different renderings since the sampling process is probabilistic. The first number of Monte-Carlo samples may be larger than the second number of Monte-Carlo samples. Thus, the variance may be considered as an indicator of how noisy the first image is, and the method may be regarded as improving detail with respect to the first image.

The method of use may obtain the second image by using the same sampling process used for obtaining the first image. In examples, a first number of Monte-Carlo samples is set and the sampling process is started from the first number. Then, the sampling process saves the second image that corresponds to half the samples of the first number. Thus, the second image is rendered with a second number of Monte-Carlo samples wherein the second number is half the first number of Monte-Carlo samples. The rendering of the first image may correspond to the rendering with the first number of samples or by further adaptation on the rendering with the first number of samples. This way of rendering the first and second images is thus a particularly efficient sampling process for obtaining the first and second images, as the rendering of both is optimized to be performed in a single run in the system. For example, the system may be set the first number to be, e.g., n=128 samples and start the sampling process. Then, the image corresponding to performing the intermediate step of the sampling process, i.e., s=64 samples is stored in memory as the second image; the system next continues sampling up-to reaching the n samples. Then, the obtained image with the first number of n samples is further adapted by removing the 64 samples s that correspond to the second image. For example, this adaptation may be performed by multiplying the image corresponding to n=128 samples by 2, and subtracting the second image corresponding to the 64 samples s. The arithmetic operations are to be understood as operations performed with the matrices of the images. The result is an image of samples s'=n−s, which corresponds to the rendering of the first image after adaptation of the first number of samples. The resulting first image (after adaptation) is independent of the samples s of the second image (corresponding to the s' samples), i.e., the noise between the two images is not correlated, by construction. In turn, this achieves the same result as rendering two independent with the same number of sample images but avoiding to re-start the sampling process. Thus, the method allows to render the first and second images without restarting the sampling process to perform the rendering only further needing to store an intermediate result (i.e., the second image) of the sampling process, which makes the method better integrated to existing rendering architectures. For example, uniform rendering of a Monte-Carlo image is an iterative process where each iteration accumulates one additional sample to each pixel of the image. This means that, at each point of the sampling time, there is only the accumulated version of the image present, as per the uniform sampling. Thus, by obtaining the second image from the same process of the same image, the second image may be obtained by simple removal of samples of the first image. If the first image is adapted by removing the samples of the second image, the first and second images are independent, which makes it in turn easier to compute the variance, and thus to improve the quality of the rendering.

In examples, the provided first Monte-Carlo ray-traced image may be rendered according to a first random seed and the provided second Monte-Carlo ray-traced image may be rendered according to a second random seed. A random seed is an initial condition for starting any sampling strategy chosen to perform the sampling. As known per se from the field of Monte-Carlo rendering, a first random seed different to a second random seed yield to different samples of a same shot, thereby obtaining different renderings of the same shot. The first number of Monte-Carlo samples may be equal to the second numbers of Monte-Carlo samples. As the first and second random seeds are different, this ensures that the noise present in the first image after the sampling process is independent from the noise present in the second image; while still requiring the same number of samples.

Example of Forming the Dataset

A combination of examples presented hereunder is now discussed with reference to FIGS. 8 to 13.

It is first discussed the metric used to compute the error map. The metric uses features of VGG19 Network, pretrained on ImageNet, to compare images. The VGG19 network consists of a convolutional feature extractor as well as a fully connected classifier. FIG. 8 shows a flowchart of the layers of the VGG19 architecture. The metric computes features for a dataset containing images with various kind of details and their respective denoised images and reference images. In tested implementations, the layers 7,9 and 12 of the VGG 19 architecture where found to be the layers that best extract features of structural details.

The respective features are normalized to equalize the magnitude of the different layer outputs before computing the squared differences between the denoised image and the reference image. FIG. 9 shows the computation of the difference of the normalized features. All of the layers after layer 12 of the VGG-19 architecture, i.e., the layers grayed out in FIG. 9, are discarded from the metric and not further used.

Since the network contains down sampling steps the spatial resolution of the different layers is different. The spatial resolution of the different layers is reduced by averaging to 1/32th of the input resolution. The output of the averaging is followed by a channel wise average to obtain a coarse error map. FIG. 10 shows a flowchart of the implementation of the down-sampling for the different layers and a resulting coarse error map.

FIGS. 11-13 show the error map computed according to the metric. FIG. 11 shows a reference image, a noisy image with less samples that the reference image, a denoised image which is the output of a denoiser, and a coarse error map computed from the normalized difference from the features of the VGG19 map. The error map shows in darker areas, the areas of low error and lighter areas correspond to areas with high error. The metric identifies the blurring caused by the denoising on the blue curtains. FIG. 12 shows corresponding zoomed sections of the same image, showing the regions on the curtains and the loss of detail of fine structural features on the floor, like cracks on the floor. FIG. 13 shows a zoomed version of an object (statue) which is far from the camera view. The error map indicates a loss of detail for such object.

Error Map Estimation

A combination of examples discussed hereunder is discussed with reference to FIGS. 14 to 18.

Figure 16:
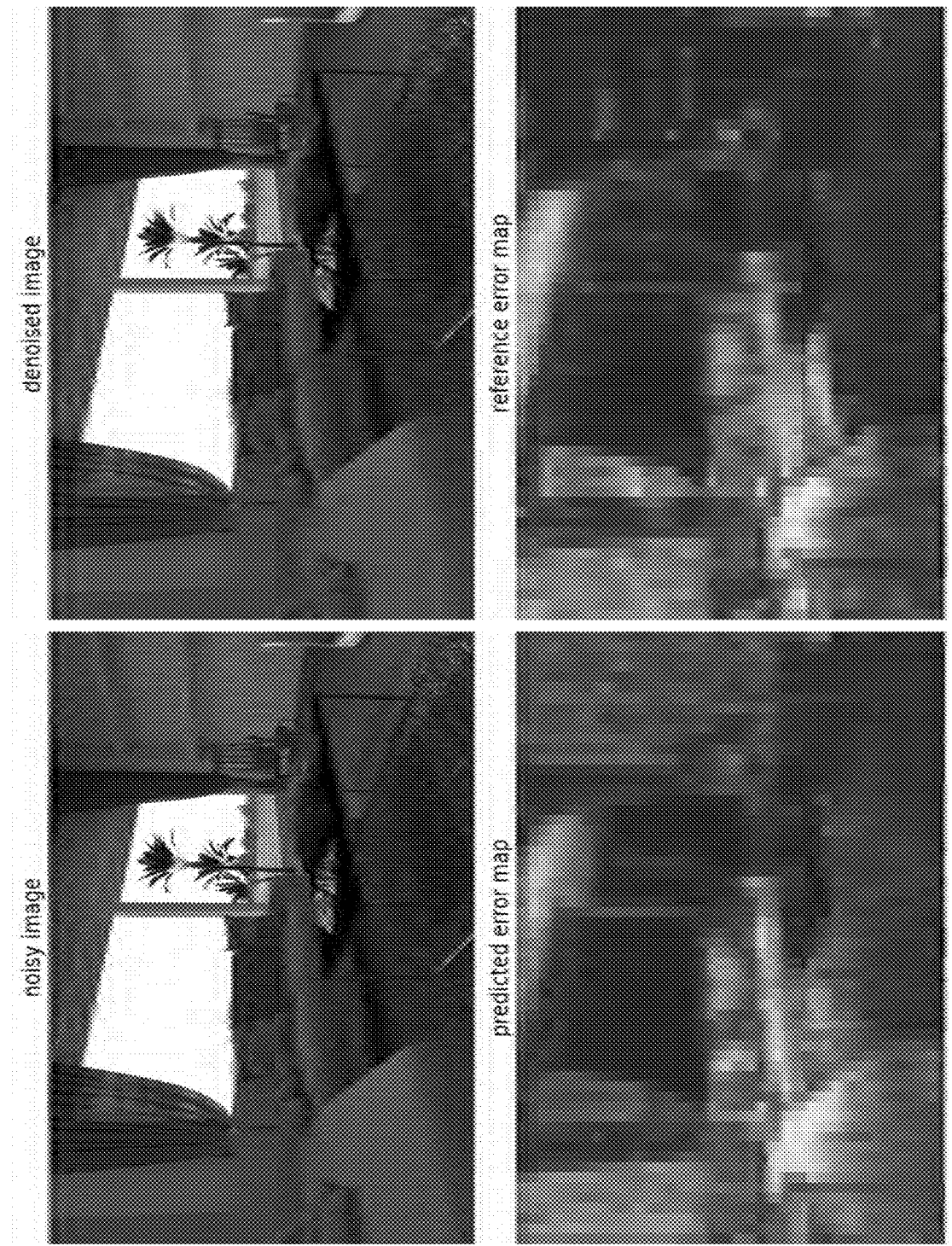
FIGS. 16, 17 and 18 show an example of error maps estimated by the CNN architecture learnt based on the formed dataset.
Figure 17:
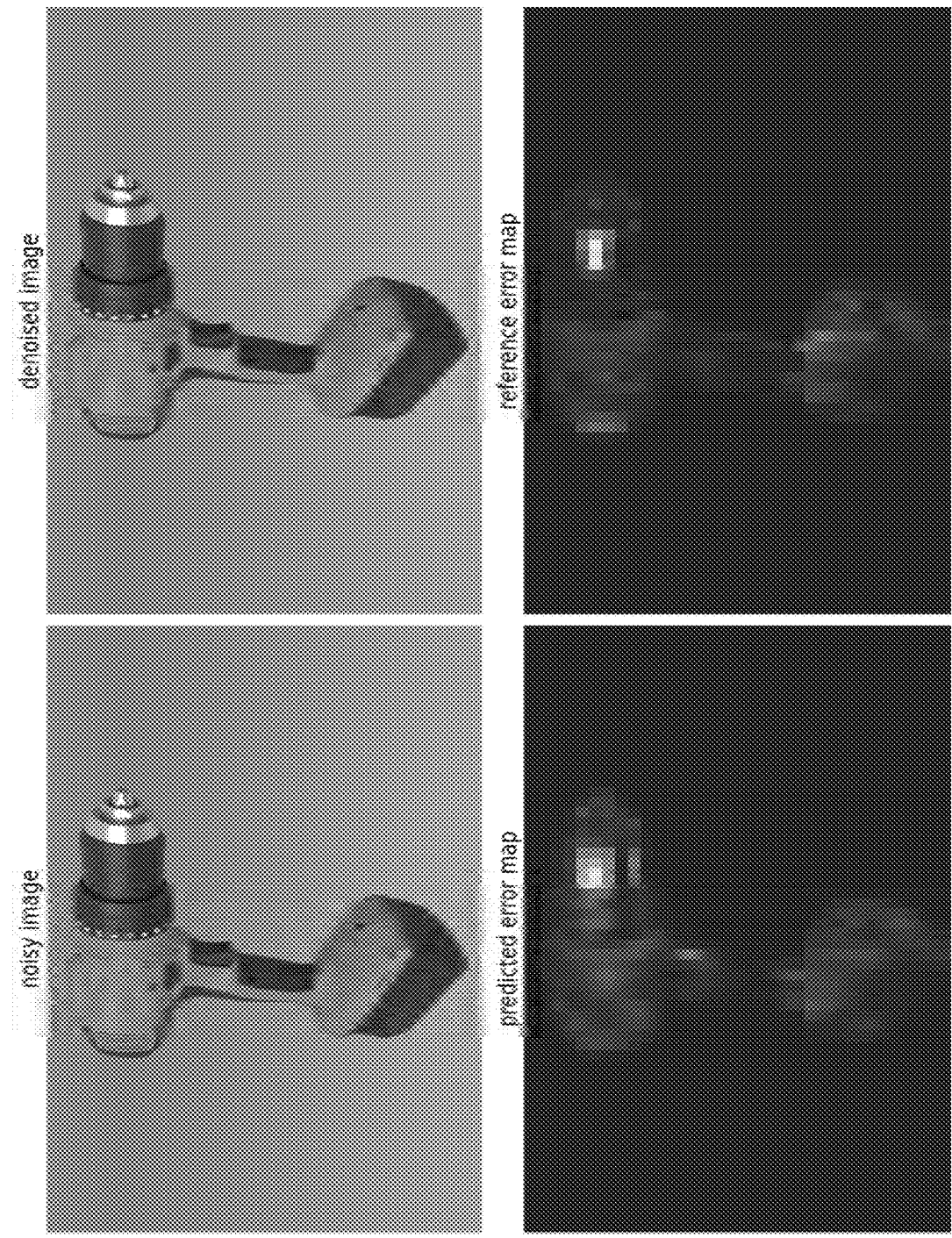
Figure 18:
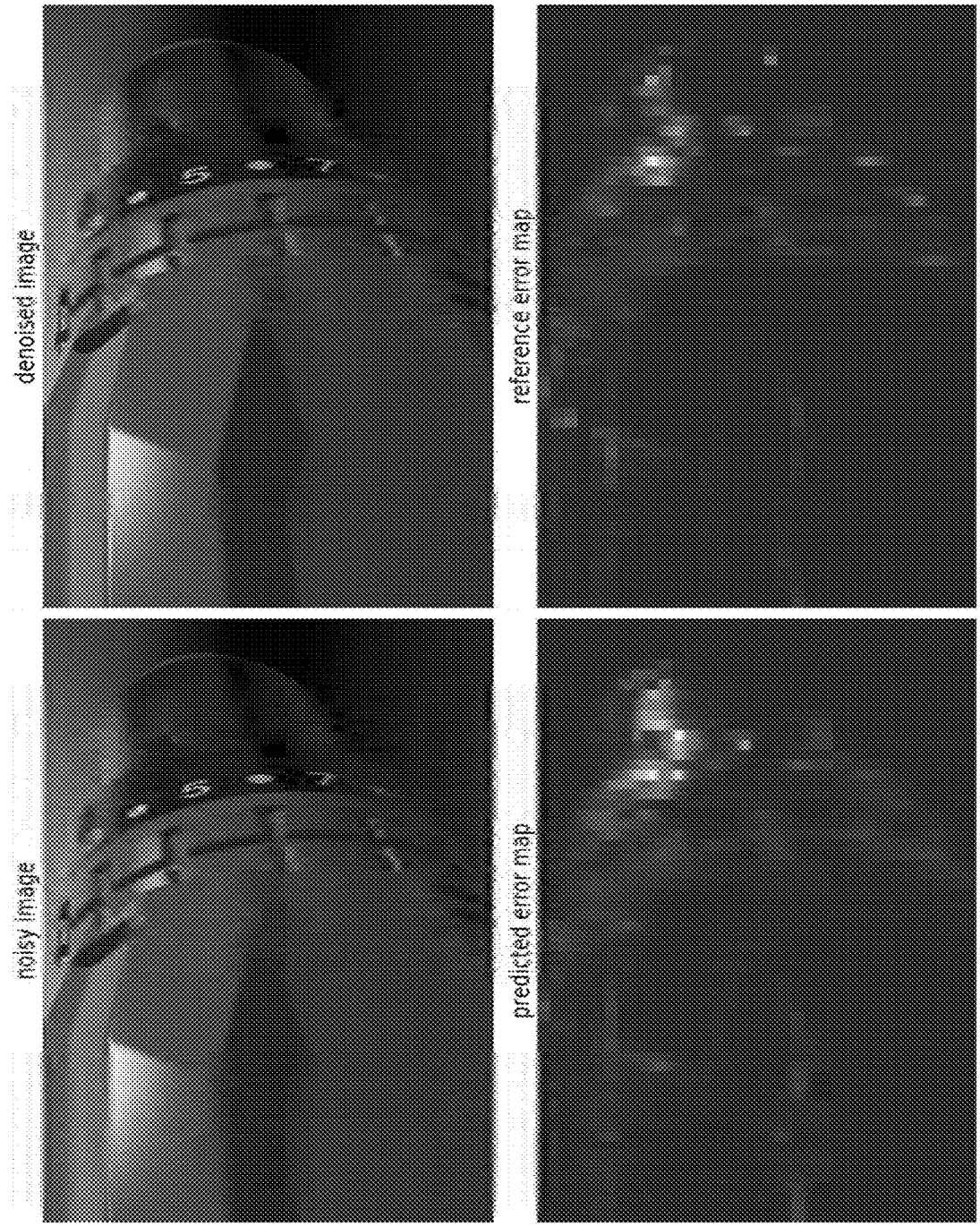

Since the reference image is normally not present in a real-world scenario, the error map needs to be generated without it. The convolutional neural network is trained to estimate the error map. To train the network a dataset is created, having error maps computed from the metric. The dataset contains 2437 shots containing various objects in different lighting scenarios with all kind of structural details (like leather, carpets, stonework, wallpaper, rough metal, metal floor or fine details in plastic). Each shot was rendered with different sample counts (1-512) as well as reference images with 131072 samples (iterations of rendering) per pixel. The metric described earlier is used to generate ground truth outputs. Next, the network is trained in supervised fashion for approximately 24 hours. In the tested implementation, the training setup provides a good tradeoff between the time used to train the dataset and the accuracy of the trained network architecture. FIG. 14 shows the network architecture. The network architecture is similar to the VGG19 feature extractor, in the metric, layers 0 to 12 of the feature extractor are used. The main difference is the number of input channel, since the denoised image as well as the same inputs the denoiser uses (noisy, albedo and normal buffer) is fed into the network. FIG. 15 illustrates the supervised learning. The trained network directly outputs the error map corresponding to the input image. FIGS. 16-18 show estimated error maps obtained by the tested implementation. FIG. 16 corresponds to a shot of an interior scene. The figure of the left corresponds to a noisy image with low samples. Continuing clockwise, the second image corresponds to the denoise image. For the sake of comparison, the error map corresponding to comparing the denoised image with the reference error map is also shown in the lower right side, while the estimated error map (also called predicted error map) is shown in the lower left side. FIG. 16-18 shows a good agreement between both error maps.

Adaptive Denoising System

A combination of examples discussed hereunder is discussed with reference to FIG. 3 and FIGS. 19 to 21.

Figure 19:
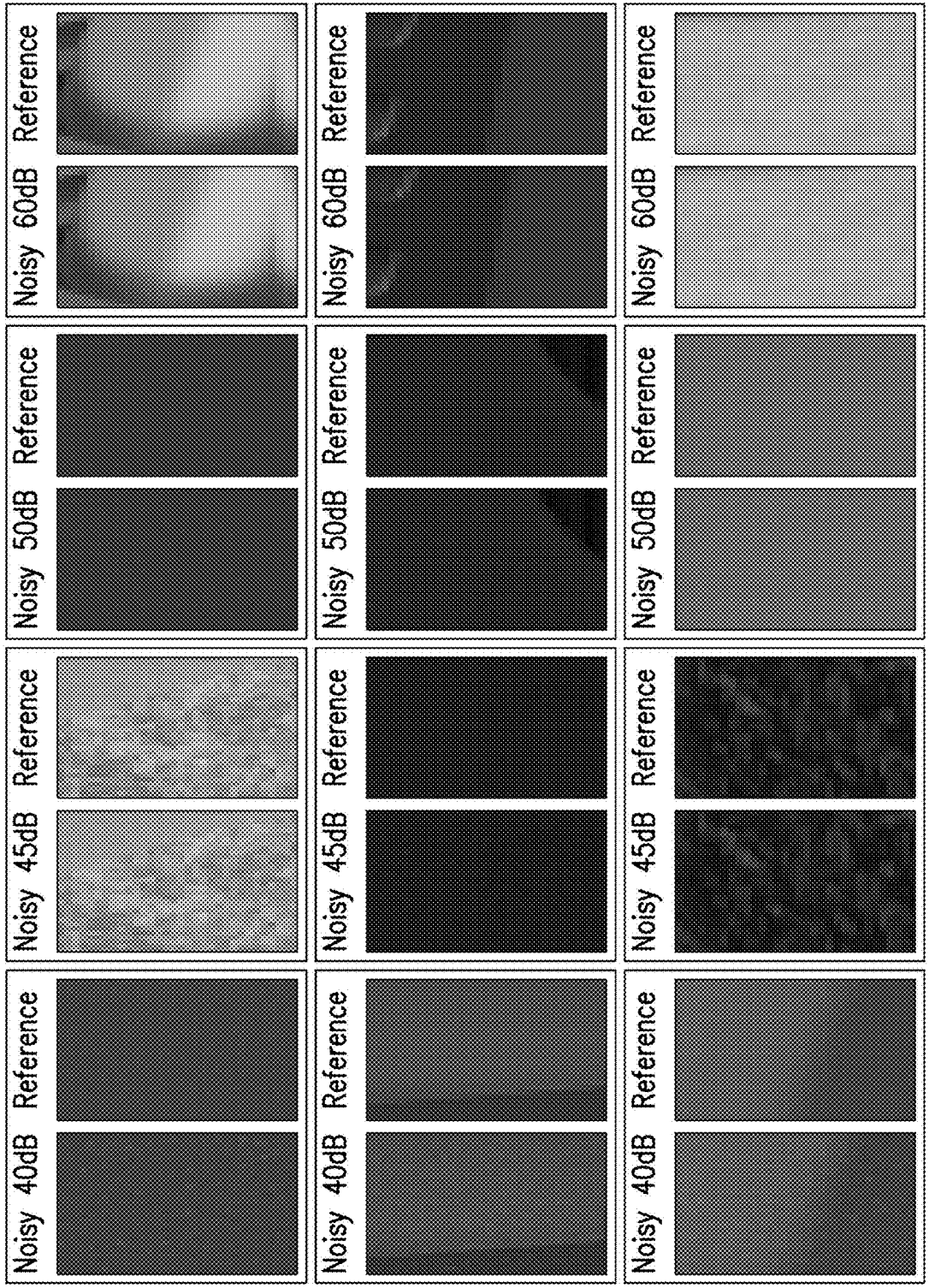
FIG. 19 shows an example of noisy images with respective signal-to-noise decibel values and a corresponding reference image.
Figure 20:
FIGS. 20-21 show examples of images being denoised according to different target signal-to-noise decibel values.

The following example relates to the adaptive denoiser to denoise adaptively an image. The example uses low sample counts for the variance estimator but requires rendering the sample map with high enough sample count, e.g., enough to reach approximately 50+dB in the relevant areas. With reference to FIG. 3, in step P10, the system renders uniformly the scene with a low sample count (e.g., 64 SPP). While rendering, it is also stored an intermediate image at half the sample count (32 in this case), which are needed for estimating variance. The 32 and 64 SPP image are fed to the variance estimator P50 to estimate how noisy the image is. The 64 SPP image as well as the corresponding normal and albedo feature buffer are fed to the denoiser P20 to generate the denoised input for the error estimation network. The resulting error map, as well as the variance estimation output in P50 are then used to compute the adaptive sample map as well as the final blend map. A tanh function is applied to the squared error map to normalize the error in the error map to the range of real numbers [0,1]. The normalized error map is next converted to a blend map, containing the desired decibel levels needed for the blending. The Peak signal-to-noise ratio decibel values are computed from the target root-mean-square error (rmse) values by the following formula: −20*log 10(rmse). Depending on the render compute budget those decibel levels can be below our blending threshold preventing blending in areas that are not converged enough. Different decibel levels are used to define the blending bounds. The implementation performs a linear blending starting at 40 db (0 blend) up to 50 db (full blend). The tested implementation compared several noise-decibel levels to define the blending thresholds. FIG. 19 shows an example of noisy images having signal to noise ratio decibel values with respect to the reference image. Noisy images having 40 db or less have higher noise, and detail increases when the decibels increase.

Figure 21:
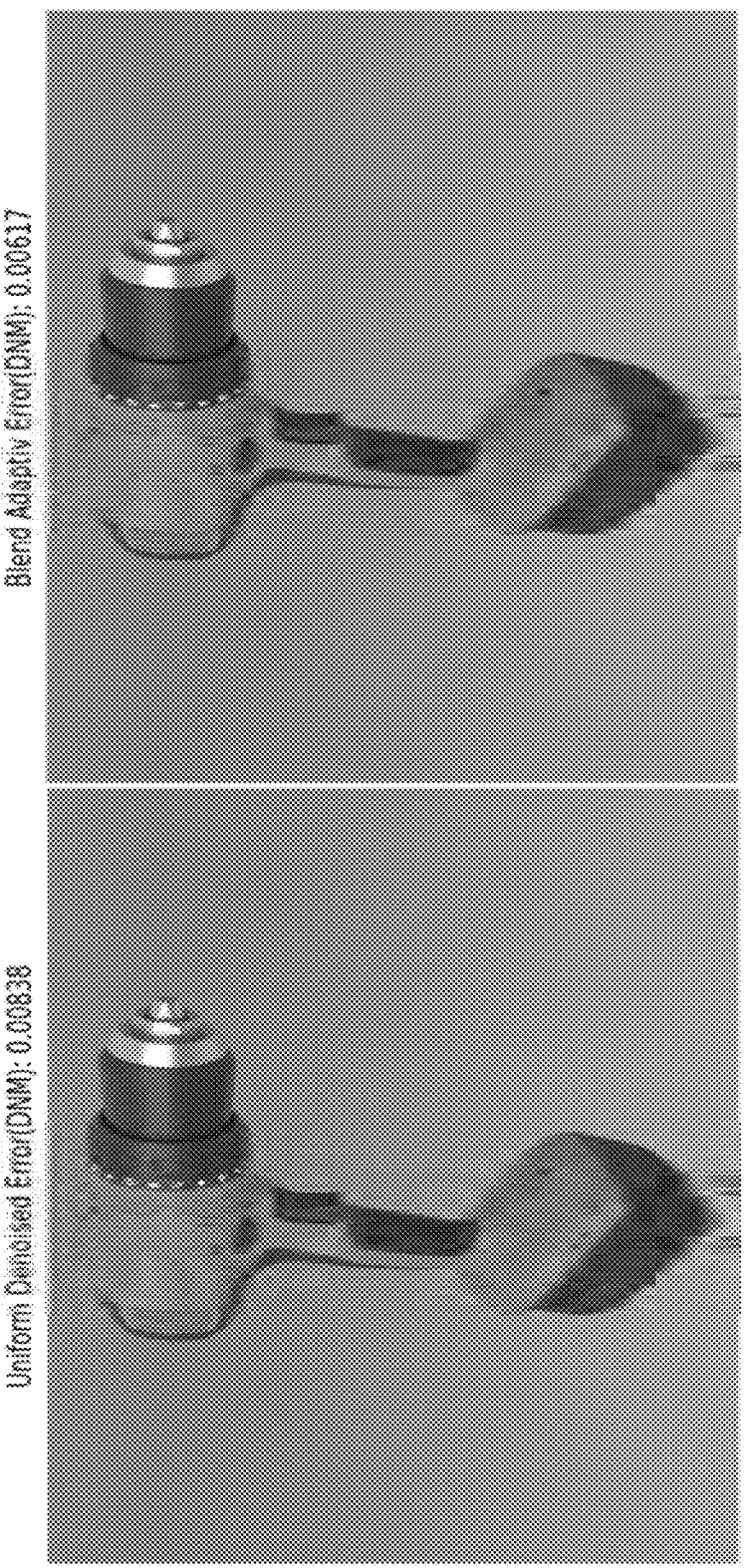

A sample map P60, indicating the required samples to reach a desired decibel level can be computing by using the variance estimator as well as the Monte-Carlo convergence properties. The sample map P60 is then fed to the renderer, which continues rendering adaptively according to the map. The output of the renderer is denoised; the denoised image is provided, together with the render output, to the blending step P90. The blending step P90 blends the render output and the denoised version according to the blend map. With roughly the same amount of compute, a significantly better image quality can be achieved with the system compared to only denoising. In the shot shown in FIG. 20, error is reduced with respect to the metric approximately by 40%. In FIG. 21, the reduction is approximately 27%.

The invention claimed is:

1. A computer-implemented method for forming a dataset configured for learning a Convolutional Neural Network (CNN) architecture, the CNN architecture comprising an image feature extractor, the method comprising:
   obtaining pairs of images, each pair comprising a reference image and a respective denoised image, the reference image being a Monte-Carlo rendered ray-traced image, the respective denoised image being a result of inputting a respective noisy image of the reference image to a denoiser; and
   for each pair of images:
      providing the pair of images to a pre-trained CNN architecture similar to the one for which the formed dataset will be configured,
      computing a difference between a first normalized feature of the denoised image and a second normalized feature of the reference image, the first and second normalized features being an output of a same layer of the pre-trained CNN architecture,
      computing an error map representing the computed difference, computing the error map including:
         down-sampling a resolution of the computed difference, and
         computing the error map with the down-sampled resolution of the difference by creating an image having pixel values, each pixel of the error map having a color following a color scale that penalizes the computed difference, thereby obtaining a coarse error map, and
      adding the respective denoised image and the error map to the dataset.

2. The method of claim 1, wherein the pre-trained CNN architecture is a Visual Geometric Group (VGG) architecture.

3. The method of claim 2, wherein the Visual Geometric Group (VGG) architecture is a VGG-19 architecture, and wherein the first normalized feature of the denoised image and the second normalized feature of the reference image are extracted from 7th and/or 9th and/or 12th layers of the VGG-19 architecture.

4. The method of claim 1, wherein the adding further comprises:
   adding to the dataset the respective denoised image, the error map, and a respective noisy image of the reference image, the noisy image being the one from which the denoised image has been obtained.

5. The method of claim 1, wherein the respective denoised image is a result of inputting to a denoiser a lower sample count image of the reference image denoised by the denoiser.

6. A non-transitory computer-readable storage medium having recorded thereon a data structure representing a dataset formable according to a computer-implemented method for forming a dataset configured for learning a Convolutional Neural Network (CNN) architecture, the CNN architecture comprising an image feature extractor, the method comprising:
   obtaining pairs of images, each pair comprising a reference image and a respective denoised image; and
   for each pair of images:
      providing the pair of images to a pre-trained CNN architecture similar to the one for which the formed dataset will be configured,
      computing a difference between a first normalized feature of the denoised image and a second normalized feature of the reference image, the first and second normalized features being an output of a same layer of the pre-trained CNN architecture,
      computing an error map representing the computed difference, computing the error map including:
         down-sampling a resolution of the computed difference, and
         computing the error map with the down-sampled resolution of the difference by creating an image having pixel values, each pixel of the error map having a color following a color scale that penalizes the computed difference, thereby obtaining a coarse error map, and
      adding the respective denoised image and the error map to the dataset.

7. The non-transitory computer-readable storage medium of claim 6, wherein the pre-trained CNN architecture is a Visual Geometric Group (VGG) architecture.

8. The non-transitory computer-readable storage medium of claim 7, wherein the Visual Geometric Group (VGG) architecture is a VGG-19 architecture, and wherein the first normalized feature of the denoised image and the second normalized feature of the reference image are extracted from 7th and/or 9th and/or 12th layers of the VGG-19 architecture.

9. The non-transitory computer-readable storage medium of claim 6, wherein the adding further comprises:
   adding to the dataset the respective denoised image, the error map, and a respective noisy image of the reference image, the noisy image being the one from which the denoised image has been obtained.

10. A computer-implemented method of applying a formed dataset configured for learning a Convolutional Neural Network (CNN) architecture, the CNN architecture comprising an image feature extractor, the method comprising:
   obtaining pairs of images, each pair comprising a reference image and a respective denoised image, the reference image being a Monte-Carlo rendered ray-traced image, the respective denoised image being a result of inputting a respective noisy image of the reference image to a denoiser;
   for each pair of images:
      providing the pair of images to a pre-trained CNN architecture similar to the one for which the formed dataset will be configured,
      computing a difference between a first normalized feature of the denoised image and a second normalized feature of the reference image, the first and second normalized features being an output of a same layer of the pre-trained CNN architecture,
      computing an error map representing the computed difference, computing the error map including:
         down-sampling a resolution of the computed difference, and
         computing the error map with the down-sampled resolution of the difference by creating an image having pixel values, each pixel of the error map having a color following a color scale that penalizes the computed difference, thereby obtaining a coarse error map, and adding the respective denoised image and the error map to the dataset; and learning the CNN architecture based on the dataset.

11. The method of claim 10, wherein the pre-trained CNN architecture is a Visual Geometric Group (VGG) architecture.

12. The method of claim 11, wherein the Visual Geometric Group (VGG) architecture is a VGG-19 architecture, and wherein the first normalized feature of the denoised image and the second normalized feature of the reference image are extracted from 7th and/or 9th and/or 12th layers of the VGG-19 architecture.

13. A non-transitory computer-readable storage medium having recorded thereon a computer program, the computer program comprising instructions for performing a computer-implemented method for forming a dataset configured for learning a Convolutional Neural Network (CNN) architecture, the CNN architecture comprising an image feature extractor, the method comprising:

obtaining pairs of images, each pair comprising a reference image and a respective denoised image, the reference image being a Monte-Carlo rendered ray-traced image, the respective denoised image being a result of inputting a respective noisy image of the reference image to a denoiser; and for each pair of images:
providing the pair of images to a pre-trained CNN architecture similar to the one for which the formed dataset will be configured, computing a difference between a first normalized feature of the denoised image and a second normalized feature of the reference image, the first and second normalized features being an output of a same layer of the pre-trained CNN architecture, computing an error map representing the computed difference, computing the error map including:

down-sampling a resolution of the computed difference, and computing the error map with the down-sampled resolution of the difference by creating an image having pixel values, each pixel of the error map having a color following a color scale that penalizes the computed difference, thereby obtaining a coarse error map, and adding the respective denoised image and the error map to the dataset.

14. The non-transitory computer-readable storage medium of claim 13, wherein the pre-trained CNN architecture is a Visual Geometric Group (VGG) architecture.

15. The non-transitory computer-readable storage medium of claim 14, wherein the Visual Geometric Group (VGG) architecture is a VGG-19 architecture, and wherein the first normalized feature of the denoised image and the second normalized feature of the reference image are extracted from 7th and/or 9th and/or 12th layers of the VGG-19 architecture.

16. The non-transitory computer-readable storage medium of claim 13, wherein the adding further comprises:

adding to the dataset the respective denoised image, the error map, and a respective noisy image of the reference image, the noisy image being the one from which the denoised image has been obtained.

* * * * *